(12) United States Patent
Breckenridge et al.

(10) Patent No.: US 10,013,784 B2
(45) Date of Patent: Jul. 3, 2018

(54) GENERATING AN ASSEMBLED GROUP IMAGE FROM SUBJECT IMAGES

(71) Applicant: Lifetouch Inc., Eden Prairie, MN (US)

(72) Inventors: Michael T. Breckenridge, Plymouth, MN (US); Eric J. Runquist, Minneapolis, MN (US); Michael J. Surma, Eagan, MN (US); Earl John Adolphi, Los Lunas, NM (US)

(73) Assignee: Lifetouch Inc., Eden Prairie, MN (US)

( * ) Notice: Subject to any disclaimer, the term of this patent is extended or adjusted under 35 U.S.C. 154(b) by 0 days.

(21) Appl. No.: 14/682,686

(22) Filed: Apr. 9, 2015

(65) Prior Publication Data

US 2016/0012623 A1    Jan. 14, 2016

Related U.S. Application Data

(63) Continuation of application No. 13/720,509, filed on Dec. 19, 2012, now Pat. No. 9,025,906.

(51) Int. Cl.
*G06K 9/36* (2006.01)
*G06T 11/60* (2006.01)
(Continued)

(52) U.S. Cl.
CPC ............... *G06T 11/60* (2013.01); *G06T 7/50* (2017.01); *G06T 7/68* (2017.01); *G06T 7/74* (2017.01);
(Continued)

(58) Field of Classification Search
CPC ...... H04N 5/2256; H04N 5/272; H04N 5/772; H04N 9/8205; H04N 13/0014; H04N 13/026; H04N 2213/002; H04N 1/00442; H04N 1/3875; H04N 1/3876; H04N 19/27; H04N 1/387; H04N 1/3872; H04N 1/393; G06K 9/00201; G06K 9/00342; G06K 9/00348; G06K 9/00362; G06K 9/00369; G06K 9/00697; G06K 9/00704; G06K 9/00228; G06K 9/00624; G06K 9/00664; G06K 2209/27; G06K 9/00677; G06K 9/00684; G06K 9/00691; G06T 11/60; G06T 3/40; G06T 3/4038; G06T 9/001; G06T 7/0044; G06T 7/0051; G06T 7/608;
(Continued)

(56) References Cited

U.S. PATENT DOCUMENTS 5,383,027 A * 1/1995 Harvey ................. H04N 1/195
345/629
6,278,526 B1 * 8/2001 Kurozasa ........... H04N 1/00236
358/1.13
(Continued)

OTHER PUBLICATIONS

Surma, Michael J., U.S. Appl. No. 61/620,254, Photography Station With Depth and Position Detection, filed Apr. 4, 2012.
(Continued)

Primary Examiner — Jose Couso
(74) Attorney, Agent, or Firm — Merchant & Gould P.C.

(57) ABSTRACT

An assembled group image is generated from subject images. Each of the subject images is associated with height data for the subject in the image. The height data is used to position the subject images in the assembled group image to provide a natural appearance. Shadows can also be added to the assembled group image.

21 Claims, 17 Drawing Sheets

(51) Int. Cl.
 *G06T 7/73* (2017.01)
 *G06T 7/50* (2017.01)
 *G06T 7/68* (2017.01)
(52) U.S. Cl.
 CPC ............... *G06T 2207/10028* (2013.01); *G06T 2207/20221* (2013.01); *G06T 2207/30196* (2013.01)
(58) Field of Classification Search
 CPC . G06T 2207/10004; G06T 2207/20212; G06T 2207/20221; G06T 2207/20224; G06F 3/0482; G06F 17/30265; G06F 17/30244; G06F 17/30259; G06F 17/30268; G06F 17/3028; G06F 17/30286; Y10S 707/915; Y10S 707/99933; Y10S 707/99943; Y10S 707/99945; Y10S 707/99948
 See application file for complete search history.

(56) References Cited

U.S. PATENT DOCUMENTS

| | | | | |
|---|---|---|---|---|
| 7,133,050 | B2 * | 11/2006 | Schowtka | G06T 3/40 345/619 |
| 7,339,598 | B2 * | 3/2008 | Schowtka | G06T 3/40 345/619 |
| 7,440,013 | B2 * | 10/2008 | Funakura | G06K 9/00228 348/239 |
| 7,714,908 | B2 | 5/2010 | Holmes | |
| 7,834,894 | B2 | 11/2010 | Swanson | |
| 8,180,103 | B2 | 5/2012 | Kitaura et al. | |
| 8,442,354 | B2 * | 5/2013 | Nakashio | G06T 3/4038 348/36 |
| 8,509,521 | B2 | 8/2013 | Keating et al. | |
| 8,564,691 | B2 * | 10/2013 | Tsuda | H04N 5/235 348/230.1 |
| 8,780,230 | B2 * | 7/2014 | Counts | G06T 11/60 348/231.2 |
| 9,014,487 | B2 * | 4/2015 | Kato | G06K 9/6202 382/115 |
| 9,025,906 | B2 * | 5/2015 | Breckenridge | G06T 11/60 382/284 |
| 9,396,572 | B2 * | 7/2016 | Feng | G06T 11/60 |
| 2009/0021594 | A1 * | 1/2009 | Tsuda | H04N 5/235 348/222.1 |
| 2014/0169696 | A1 * | 6/2014 | Breckenridge | G06T 11/60 382/284 |

OTHER PUBLICATIONS

Candid Color Systems, Innovative Products, www.candid.com/products/innovative_products/faux_groups.aspx, Jun. 11, 2012, 3 pages.

Candid Color Systems, 2012 Candid Color Systems Catalog, Green Screen Technology, 2012, 114 pages.

\* cited by examiner

US 10,013,784 B2

GENERATING AN ASSEMBLED GROUP IMAGE FROM SUBJECT IMAGES

CROSS-REFERENCE TO RELATED APPLICATION

This application is a continuation of U.S. patent application Ser. No. 13/720,509 filed on Dec. 19, 2012, now U.S. Pat. No. 9,025,906 issued on May 5, 2015, and entitled GENERATING AN ASSEMBLED GROUP IMAGE FROM SUBJECT IMAGES, the disclosure of which is incorporated by reference herein in its entirety.

BACKGROUND

Photographing groups of people typically involves gathering all of the people together at a single time and place, and capturing one or more photographs of the people while they are gathered together. Various groups can be photographed in this manner. For example, a group may consist of a family, a sports team, employees of a business, and the like.

The difficulties in obtaining a high quality group photograph are numerous. To begin, it is often difficult to gather all of the appropriate people together at the same time. If they cannot be gathered together, certain people may be missing in the photograph. It can also be very difficult to simultaneously coordinate the expressions of people in the photograph so that they all have appropriate facial expressions at the time that the photograph is taken.

Another difficulty with such group photographs is that they cannot be updated or modified without repeating the group photography session with the full set of people. So, for example, when an employee leaves a company, or a new employee is hired, the group photograph must be retaken with the current set of employees.

SUMMARY

In general terms, this disclosure is directed to the generation of an assembled group image from individual images. In one possible configuration and by non-limiting example, the assembled group image is generated utilizing height data.

One aspect is a method of generating an assembled group image from individual subject images, the method comprising: determining a preliminary arrangement for the individual subject images, the preliminary arrangement including preliminary subject positions; determining vertical shift factors using subject height data; generating with a computing device a final arrangement for the individual subject images, the final arrangement including final subject positions that are vertically shifted from the preliminary subject positions by the vertical shift factors; and generating the assembled group image by arranging the individual subject images at the final subject positions.

Another aspect is an assembly station for generating an assembled group image from individual subject images, the assembly station comprising: at least one processing device; and at least one computer readable storage device, wherein the at least one computer readable storage device comprises data instructions, which when executed by the at least one processing device generate: a preliminary subject layout engine that determines a preliminary arrangement for individual subject images, the preliminary arrangement including preliminary subject positions; a subject height adjustment engine that determines vertical shift factors using subject height data; a subject height adjustment engine that generates a final arrangement for the individual subject images, the final arrangement including final subject positions that are vertically shifted from the preliminary subject positions by the vertical shift factors; and a rendering engine that generates the assembled group image by arranging the individual subject images at the final subject positions.

A further aspect is a method of generating an assembled group image, the method comprising: obtaining individual subject images; obtaining height data associated with the individual subject images; arranging at least some of the individual subject images into an assembled group image using the height data.

DETAILED DESCRIPTION

Figure 1:
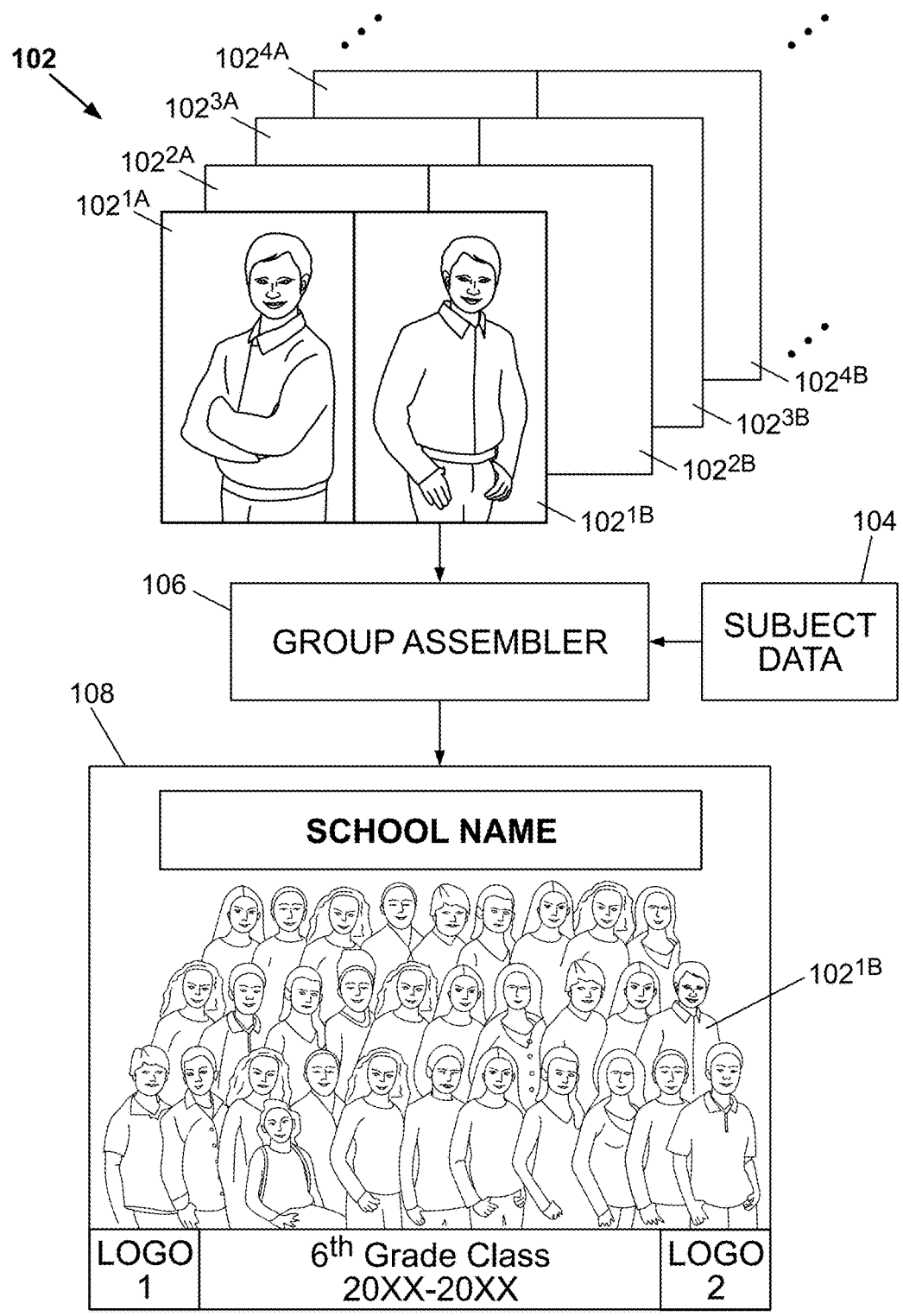
FIG. 1 is a schematic diagram illustrating the generation of a group assembled image.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram illustrating the generation of a group assembled image. The diagram includes individual subject images 102, subject data 104, a group assembler 106, and an assembled group image 108.

The individual subject images 102 are visual representations of multiple subjects, which are typically captured using a digital camera. In some embodiments, the individual subject images 102 each store a visual representation of only one subject. In some embodiments, the images 102 are encoded in a digital image file format, such as the joint photographic experts group (JPEG) digital image format. Other embodiments use other formats, such as exchangeable image file format (EXIF), tagged image file format (TIFF), raw image format (RAW), portable network graphics (PNG) format, graphics interchange format (GIF), bitmap file format (BMP), portable bitmap (PBM) format, or other digital file formats. In some embodiments the images 102 are stored as individual image files, each having a file name. In some embodiments, the file name can be used to uniquely identify the image. In some embodiments, the subject images 102 include metadata. The metadata can store data, such as an identifier, that is used to link the image with the associated data in the subject data 104 for that image. An example of an identifier is a subject identification number. Another example of an identifier is the name of the subject.

In some embodiments, there may be multiple subject images 102 available for a single subject. In the example depicted in FIG. 1, the first subject (subject 1) has two subject images $102^{1A}$ and $102^{1B}$. A second subject (subject 2) also has two subject images $102^{2A}$ and $102^{2B}$. Additional subjects can similarly have one or more respective images ($102^{3A}$, $102^{3B}$, $102^{4A}$, $102^{4B}$, etc.). More or fewer images can be provided for a given subject, and some subjects may have more images than other subjects. The multiple images for a subject typically include different visual representations of the subject, such as depicting the subject in different poses.

In some embodiments, the subject images 102 may contain multiple subjects. For example, two subjects could be captured at the same time, and subsequently combined (or separated and then combined) with additional subjects into an assembled group image, as discussed herein.

Subject data 104 is also provided in some embodiments. The subject data 104 contains data relating to the subjects depicted in the subject images 102. For example, the subject data 104 can identify the subject's name, subject identification numbers (school ID, employee ID, etc.), the subject's group affiliations, the subject's status within a group, etc. Examples of the subject images 102 and subject data 104 are illustrated and described in more detail with reference to FIG. 4.

The group assembler 106 generates the assembled group image 108 using at least some of the subject images 102 and the subject data 104. The assembled group image 108 depicts multiple of the subjects in a single image. In some embodiments, the assembled group image 108 resembles a group photograph obtained by gathering the subjects together as a group and photographing them all at the same time. In many embodiments, the group assembler 106 generates the assembled group image 108 without using a template having predefined positions for the subjects. Instead, the group assembler 106 determines appropriate positions for each subject within the assembled group image 108, such as based at least in part on one or more of: layout rules, a quantity of subjects, subject height data, subject weight data, subject status within group data, or other data or factors.

The assembled group image 108 is then stored in computer readable storage media. In some embodiments, the assembled group image 108 is stored as an image file. In other embodiments, the assembled group image 108 is stored as separate subject image files, and assembly data that defines the positions for each of the subject images determined by the group assembler 106, so that an image file can be subsequently generated.

Figure 2:
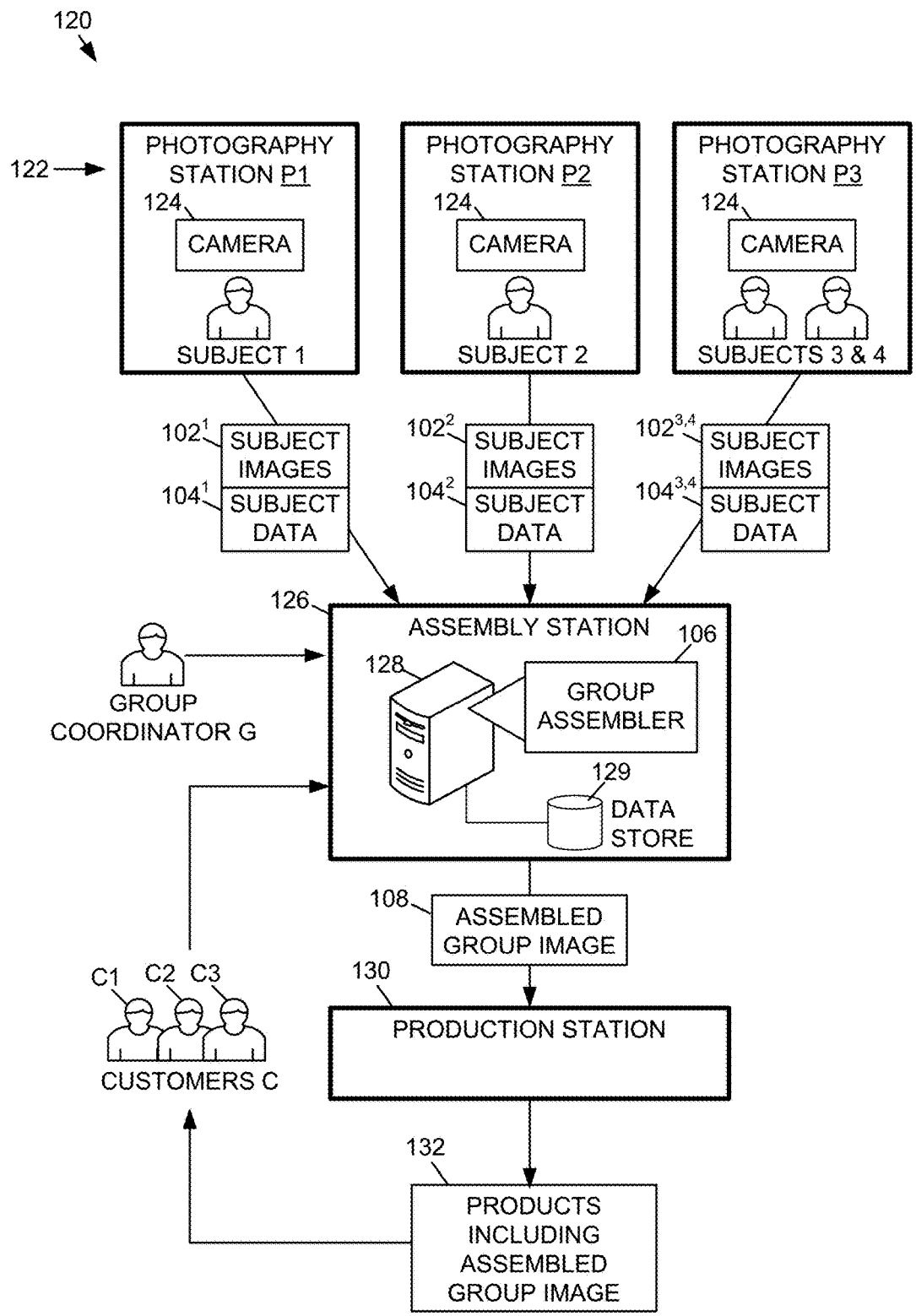
FIG. 2 is a schematic block diagram illustrating a system for producing products involving the assembled group image.

FIG. 2 is a schematic block diagram illustrating a system 120 for producing products involving assembled group images. In this example, the system 120 includes photography stations 122 (including stations P1, P2, and P3) having cameras 124, assembly station 126 (including computing device 128, group assembler 106, and data store 129), and a production station 130. FIG. 2 also illustrates subject images 102, subject data 104, assembled group image 108, products 132, subjects (including subjects 1, 2, 3, and 4), group coordinator G, and customers C (including customers C1, C2, and C3).

The photography stations 122 include at least one camera 124 that operates to capture a photograph of at least one of the subjects. Cameras 124 can be film or digital cameras, and can be still or video cameras. If film cameras are used, the resulting prints are typically scanned by a scanner device into digital form. The resulting digital images are at least temporarily stored in computer readable storage medium as subject images 102, which are then transferred to the assembly station 126. The transfer can occur across a data communication network (such as the Internet, a local area network, a cellular telephone network, or other data communication network), or can occur by physically transferring the computer readable storage medium containing the subject images 102 (such as by personal delivery or mail) to the assembly station 126.

Each photography station 122 can be at a common location, or some or all of the photography stations 122 can be at different locations. For example, for a school photography session, each of the photography stations 122 can be setup in the school. As another example, however, the photography stations 122 can be setup in a retail store environment (such as a portrait studio), and the stations 122 can be in different cities, states, countries, continents, etc. In this example, the subjects (e.g., subjects 1-4) can have their pictures taken at the closest or most convenient photography station 122 location, and the subjects are not required to travel to a common location. For example, subject 1 has pictures taken at photography station P1, subject 2 has pictures taken at photography station P2, and subjects 3 and 4 have pictures taken at photography station P3.

In some embodiments, the photography stations 122 are operated by a professional photographer. In other possible embodiments, the photography stations are automated. An example of an automated photography station 122 is a photo booth where the subject can interact directly with the photography station 122 to complete the photography session.

In its most basic configuration, the photography station 122 can simply be a location where the camera 124 is located, which may be outdoors or indoors, and may be operated by a photographer or the subject. In other possible embodiments, the photography station can include additional hardware, such as lighting systems, control systems, a height detection device, a pose detection device, or other physical objects or devices. One specific example of a photography station 122 is illustrated and described in more detail herein with reference to FIG. 3.

In some embodiments, the photography station 122 generates subject data 104, which contains information relating to the one or more subjects in the subject images 102. One possible way to collect subject data is by using a subject data card that is given to the subject at or before the photography session. The subject data card can include a computer readable code, such as a barcode, which can be read by a scanner to provide the information to a computing device at the photography station. Examples are described in U.S. Pat. No. 7,714,918, issued on May 11, 2010, titled Identifying and Tracking Digital Images With Customized Metadata, such as in FIGS. 8 and 9. In some embodiments, subject data is provided by the subject, someone associated with the subject (such as a parent, colleague, or the group coordinator G). Some or all of the subject data can be stored within metadata of the subject images 102, or separate from the subject images 102, such as in a subject data file. The images 102 and subject data 104 are associated with each other, so that subject data for subject 1 is associated with subject images 102[1] for the same subject, and so on for all subjects.

Examples of subject data can include a subject name, a subject identification number (school ID number, company ID number, driver's license number, social security number, etc.), group affiliation data (a school, a class, a team, a club, a business unit, a department, etc.), physical characteristic data (subject height, subject weight, subject clothing color, subject skin color, subject hair color, subject hair height, etc.), body position data (coordinates of body parts such as joints, hands, feet, head, facial features, etc.), pose data (e.g., an identification of the subject's pose in one or more subject images, such as the direction the subject is facing, whether the subject is standing, kneeling, sitting, or laying down, whether the arms are straight, bent, or crossed, whether the subject is holding a prop), or any other desired information about or related to the subjects in the subject images 102.

In another possible embodiment, some or all of the subject data 104 can be provided directly to the assembly station 126, rather than (or in addition to) the photography station. For example, the subjects 1-4 and/or a group coordinator G (or other persons) can provide some or all of the subject data to the assembly station before or after subject images 102 are captured. As one example, a school employee acts as the group coordinator G for the students of the school. The school employee provides subject data including the names, identification numbers, and group affiliation data. The group affiliation data identifies the students in each grade (Kindergarten, first, second, third, etc.), the students in a club (the baseball team, the debate club, the yearbook committee, etc.), or any other group affiliations.

The assembly station 126 typically includes one or more computing devices 128. An example of the computing device 128 is illustrated and described herein with reference to FIG. 5. The computing device 128 typically includes at least a processing device and one or more computer readable storage media.

The group assembler 106 is executed by one or more computing devices 128 in some embodiments. In some embodiments the group assembler 106 is stored in computer readable storage media and includes instructions that are executable by the processing device to perform the operations of the group assembler 106. An example of the group assembler 106 is illustrated and described in more detail with reference to FIG. 6.

The data store 129 is provided to store data used by and generated by the group assembler 106, such as the subject images 102 and subject data 104 received from the photography stations 122. The data store 129 typically includes one or more computer readable storage media that operate to store digital data. The data store 129 can be part of the computing device 128 or separate from but in data communication with the computing device 128. An example of the data store 129 is also illustrated and described in more detail herein with reference to FIG. 6.

The group assembler 106 generates the assembled group image 108 from the subject images 102, as shown in FIG. 1. Additional details regarding exemplary embodiments of the group assembler 106 are illustrated and described in more detail herein with reference to FIGS. 6-17.

In some embodiments the assembled group image 108 is provided to a production station 130, which generates products 132 from or including the assembled group image 108. In some embodiments, the production station 130 includes a printer that generates a print of the assembled group image 108 on photographic paper. The print can be the final product, or the print can be part of the product, such as a yearbook, scrapbook, business publication, calendar, keychain, and the like. In some embodiments, the assembled group image 108 is applied to an object, such as a t-shirt or a coffee mug.

The production station 130 includes a computing device. For example, in some embodiments the production station 130 uses the computing device to save the assembled group image 108 on a computer readable storage medium, such as a CD, DVD, or a memory card or stick. In another possible embodiment, the production station 130 includes a web server computing device, which is in data communication with a data communication network, such as the Internet. The web server can distribute a digital product including the assembled group image 108 across the data communication network, such as through a web page, in an e-mail message, through a text message, or by other data communication techniques.

The products 132 are ultimately delivered to customers C by personal delivery, mail, or electronic data communication, as several examples. The products may be first delivered to an intermediary, such as the group coordinator G, who then distributes the products 132 to the appropriate customer (e.g., C1, C2, or C3).

Figure 3:
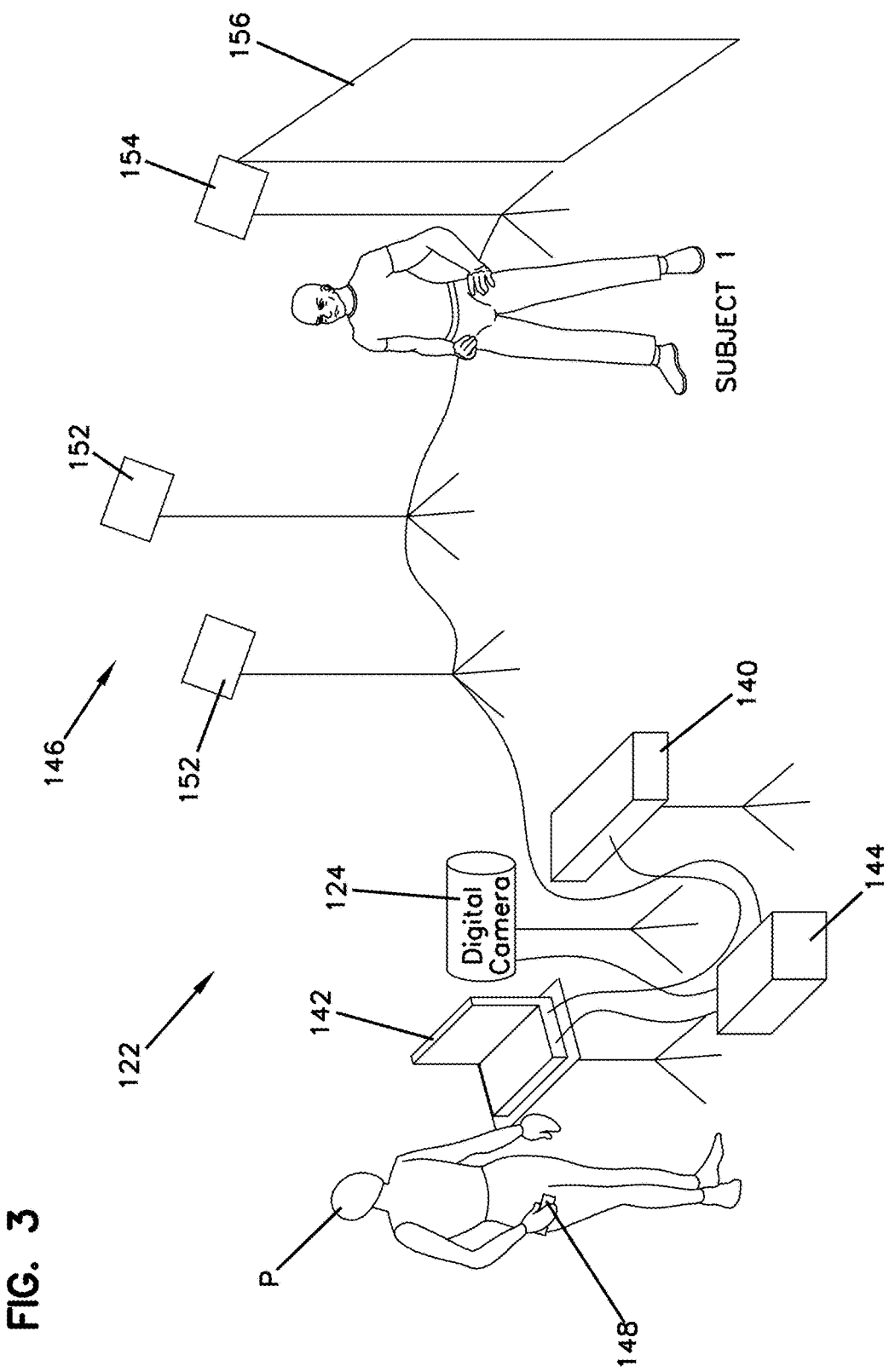
FIG. 3 is a schematic block diagram of an example of a photography station.

FIG. 3 is a schematic block diagram of an example of the photography station 122, shown in FIG. 2.

Additional information regarding the exemplary photography station 122 can be found in co-pending and commonly assigned U.S. Patent Application Ser. No. 61/620,254, filed on Apr. 4, 2012, and titled PHOTOGRAPHY STATION WITH DEPTH AND POSITION DETECTION, the disclosure of which is hereby incorporated by reference in its entirety.

In this example, the photography station 122 includes a digital camera 124, a depth and position detection device 140, and a computing device 142. In some embodiments, the photography station 122 further includes one or more of: a controller 144, lights 146, a handheld control 148, and a background 156. The lights 146 can include one or more lights, such as foreground lighting 152 and background lighting 154.

The photography station 122 operates to capture one or more photographs of one or more subjects (e.g., subject 1), and can also operate to collect additional information about the subject, such as depth data and body position data, as described herein. In some embodiments, the photography station 122 is controlled by a photographer P, who interacts with the subject to guide the subject to a good expression, and indicates to the photography station when the image should be captured.

The digital camera 124 operates to capture digital images of the subject 1. The digital camera 124 is typically a professional quality digital camera that captures high quality photographs.

The depth and position detection device 140 operates to detect the depth of objects within the field of view, and also operates to detect the body position of one or more subjects in the field of view. Examples of devices that can operate as part or all of the depth and position detection device 140 include the KINECT™ device for the XBOX® video game system, the PS1080 System on Chip from PrimeSense, Ltd., the Nite MiddleWare, also from PrimeSense, LTD, the Xtion PRO (e.g., Part No. 90IW0112-B01UA) depth sensor or the RGB & depth sensor provided by ASUS®. Additional information and downloadable software modules are also available from the OpenNI® (currently available at open-ni.org).

During use, the depth and position detection device 140 and digital camera 124 are typically arranged near to each other, so that images captured by the two devices contain similar views of the subject 1. The depth and position detection device 140 can be synchronized by the digital camera or the controller 144 so that they both capture the respective images at the same time. When synchronized, the body position of the subject is the same or nearly the same in both of the images. In some embodiments, synchronization causes the digital images (and other data) of the digital camera 124 and of the depth and position detection device to be captured within about 10 to about 50 milliseconds of each other. Some embodiments capture the images within about 30 to about 35 milliseconds of each other.

In some embodiments, data from the digital camera 124 and the depth and position detection device 140 is supplied to a computing device 142. An example of a computing device is illustrated and described in more detail with reference to FIG. 5.

The computing device 142 can be directly or indirectly connected to the digital camera 124 and depth and position detection device 140 to receive digital data. Direct connections include wired connections through one or more communication cables, and wireless communication using wireless communication devices (e.g., radio, infrared, etc.). Indirect connections include communication through one or more intermediary devices, such as a controller 144, other communication devices, other computing devices, a data communication network, and the like. Indirect connections include any communication link in which data can be communicated from one device to another device.

Some embodiments further include a controller 144. The controller 144 operates, for example, to synchronize operation of the digital camera 124 and/or the depth and position detection device 140 with the lights 146. Synchronization can alternatively be performed by the computing device 142 in some embodiments.

A handheld control 148 is provided in some embodiments for use by the photographer P. The handheld control 148 can include a capture button, for example, that is pressed by the photographer P to initiate the capture of an image with the digital camera 124 and the detection of depth and position data with the depth and position detection device 140.

Some embodiments further include a data input device, such as a barcode scanner, which may be integrated with the handheld control 148, or a separate device. The barcode scanner can be used to input data into the photography station 122. For example, the subject 1 can be provided with a card containing a barcode. The barcode is scanned by the data input device to retrieve barcode data. The barcode data includes, or is associated with, subject data that identifies the subject. The barcode data can also include or be associated with additional data, such as order data (e.g., a purchase order for products made from the images), group affiliation data (e.g., identifying the subject as being affiliated with a school, church, business, club, sports team, etc.), or other helpful information. The computing device 142 can alternatively, or additionally, operate as the data input device in some embodiments.

Lights 146 include one or more lights that operate to illuminate the subject 1 and/or the background 156. Some embodiments include the foreground light 152 and the background light 154. The foreground light 152 can include multiple lights, such as a main light and a fill light. Each of these lights, and the background light 154, can similarly include one or more light sources. Examples of light sources include incandescent bulbs, fluorescent lamps, light-emitting diodes, and discharge lamps.

The foreground light 152 is arranged at least partially forward of the subject 1 to illuminate the subject. Because the background 156 is typically positioned behind the subject 1, the foreground light 152 may also illuminate the background 156.

The background light 154 is arranged and configured to illuminate the background 156. In some embodiments the background light 154 is arranged at least partially forward of the background, to illuminate a forward facing surface of the background. In other embodiments, the background light 154 is arranged at least partially behind the background, to illuminate a translucent background 156 from behind.

The foreground and background lights 152 and 154 are operated independently in some embodiments. For example, in some embodiments a first lighting condition is generated in which the background 156 is illuminated, while a first digital image is captured by the digital camera 124. A second lighting condition is generated in which at least the foreground (e.g., subject 1) is illuminated, while a second digital image is captured by the digital camera 124. The first and second digital images can then be processed to separate the foreground object (e.g., subject 1) from the background.

Additional exemplary details regarding the generation and timing of such lighting conditions, the process by which a foreground object can be separated from a background, and the replacement of the background with a different background art image are provided in U.S. Pat. No. 7,834,894, titled Method and Apparatus for Background Replacement in Still Photographs, the entire disclosure of which is hereby incorporated by reference.

The background 156 is typically a sheet of one or more materials that is arranged behind the subject 1 while an image of the subject 1 is captured. In some embodiments the background 156 is translucent, such that at least some of the light from the background light 154 is allowed to pass through. Typically the background 156 has a monochromatic color. In a preferred embodiment, the background 156 has a color, such as gray, that does not substantially add color to the subject in a digital image. In some embodiments, the background 156 is smooth, such that it has no visible pattern or fabric texture. An example of a suitable material is a rear projection screen material. Other embodiments illuminate the background 156 from the front (but behind the subject 1), such that background 156 need not be translucent. An example of a suitable material for the background 156, when front illumination is used, is a front projection screen material.

In other possible embodiments, the photography station 122 does not include background 156. Instead, another object, such as a curtain, wall, room, building, landscape, and the like, functions as the background.

Some preliminary processing operations are performed on the digital images by the digital camera 124, the computing device 142, or the controller 144, in some embodiments, before the subject images 102 are sent to the assembly station 126 for further processing. For example, in some embodiments the subject portions of the images are separated from the background portions, and the background portions are discarded. Other operations described herein as being performed by a separate computing device, can alternatively be performed at the photography station 122 in another embodiments.

A wide variety of alternative photography stations 122 can be used in other embodiments. For example, in some embodiments the photography station 122 includes a background having a single uniform color, such as green or blue (sometimes referred to as a green screen or a blue screen). Chroma key processing techniques can be used at the photography station or by a pre-processing engine described herein, to separate the background portion from the subject portion.

Figure 4:
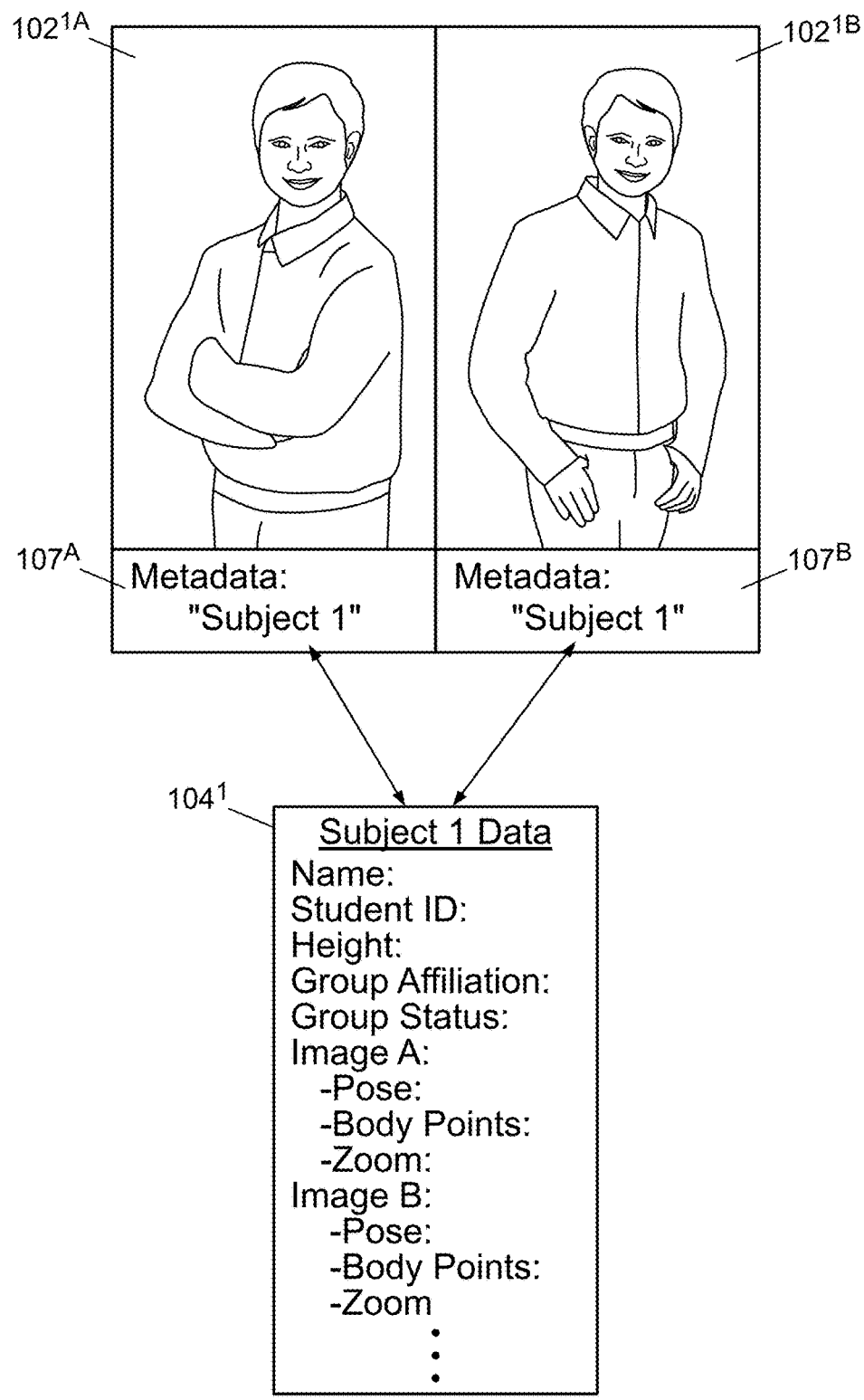
FIG. 4 is a schematic block diagram illustrating examples of subject images and associated subject data.

FIG. 4 is a schematic block diagram illustrating examples of subject images 102 and associated subject data 104, such as generated by the photography station 122 (shown in FIGS. 2-3). This example illustrates the images captured of subject 1, including subject image $102^{1A}$ and $102^{1B}$.

In some embodiments, the subject images $102^{1A}$ and $102^{1B}$ include metadata $170^A$ and $170^B$, respectively, which can be used to associate the images 102 with the subject data $104^1$. In this example, a subject identifier ("Subject 1") is stored within the image metadata 170.

Subject data $104^1$ includes the subject identifier ("Subject 1"). Because the images 102 and subject data 104 both include the same subject identifier, the images and subject data 104 can be associated with each other.

Examples of subject data 104 include a name, student identification number, height (such as detected by the depth and position detection device 140, shown in FIG. 3), group affiliation, group status, and image-specific data. The image-specific data contains data regarding a specific image. Examples of image-specific data include a pose identifier, body point coordinates (e.g., center of head point, shoulder points, elbow points, hand points, etc.), and camera zoom. Subject data 104 can include more, less, or different information, as desired.

FIGS. 5-17 describe exemplary aspects of the assembly station 126, shown in FIG. 2.

Figure 5:
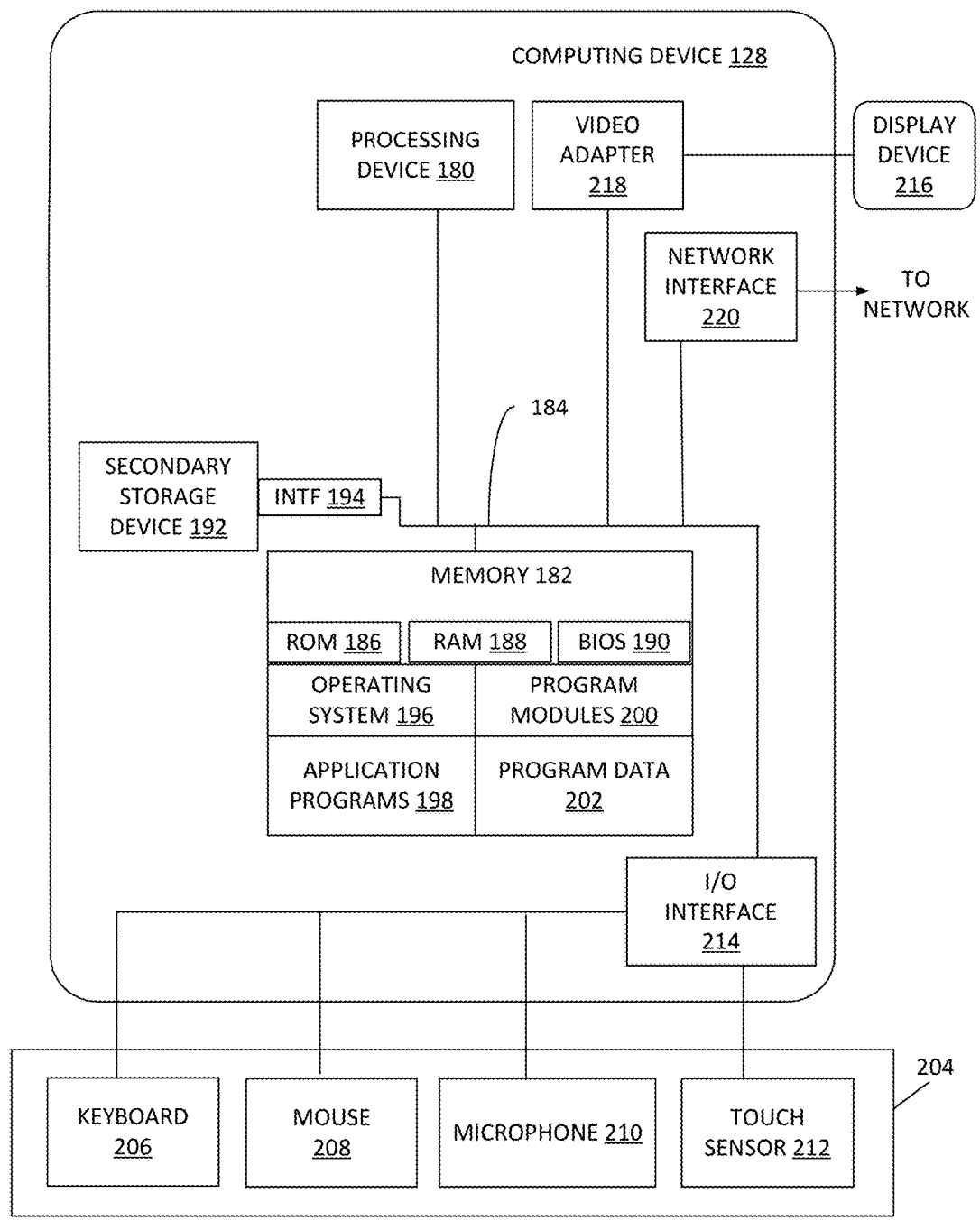
FIG. 5 illustrates an exemplary architecture of a computing device that can be used to implement aspects of the present disclosure.

FIG. 5 illustrates an exemplary architecture of a computing device that can be used to implement aspects of the present disclosure, including any of the plurality of computing devices described herein. The computing device illustrated in FIG. 5 can be used to execute the operating system, application programs, and software modules (including the software engines) described herein. By way of example, the computing device will be described below as the computing device 128 of the assembly station 126, shown in FIG. 2. To avoid undue repetition, this description of the computing device will not be separately repeated herein for each of the other computing devices, including the computing device 142, but such devices can also be configured as illustrated and described with reference to FIG. 5.

The computing device 128 includes, in some embodiments, at least one processing device 180, such as a central processing unit (CPU). A variety of processing devices are available from a variety of manufacturers, for example, Intel or Advanced Micro Devices. In this example, the computing device 128 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 128 include a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 128, such as during start up, is typically stored in the read only memory 186.

The computing device 128 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 128.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or memory 182, including an operating system 196, one or more application programs 198, other program modules 200 (such as the software engines described herein), and program data 202. The computing device 128 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 128 through one or more input devices 204. Examples of input devices 204 include a keyboard 206, mouse 208, microphone 210, and touch sensor 212 (such as a touchpad or touch sensitive display). Other embodiments include other input devices 204. The input devices are often connected to the processing device 180 through an input/output interface 214 that is coupled to the system bus 184. These input devices 204 can be connected by any number of input/output interfaces, such as a parallel port, serial port, game port, or a universal serial bus. Wireless communication between input devices and the interface 214 is possible as well, and includes infrared, BLUETOOTH® wireless technology, 802.11a/b/g/n, cellular, or other radio frequency communication systems in some possible embodiments.

In this example embodiment, a display device 216, such as a monitor, liquid crystal display device, projector, or touch sensitive display device, is also connected to the system bus 184 via an interface, such as a video adapter 218. In addition to the display device 216, the computing device 128 can include various other peripheral devices (not shown), such as speakers or a printer.

When used in a local area networking environment or a wide area networking environment (such as the Internet), the computing device 128 is typically connected to the network through a network interface 220, such as an Ethernet interface. Other possible embodiments use other communication devices. For example, some embodiments of the computing device 128 include a modem for communicating across the network.

The computing device 128 typically includes at least some form of computer readable media. Computer readable media includes any available media that can be accessed by the computing device 128. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 128.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 5 is also an example of programmable electronics, which may include one or more such computing devices, and when multiple computing devices are included, such computing devices can be coupled together with a suitable data communication network so as to collectively perform the various functions, methods, or operations disclosed herein.

Figure 6:
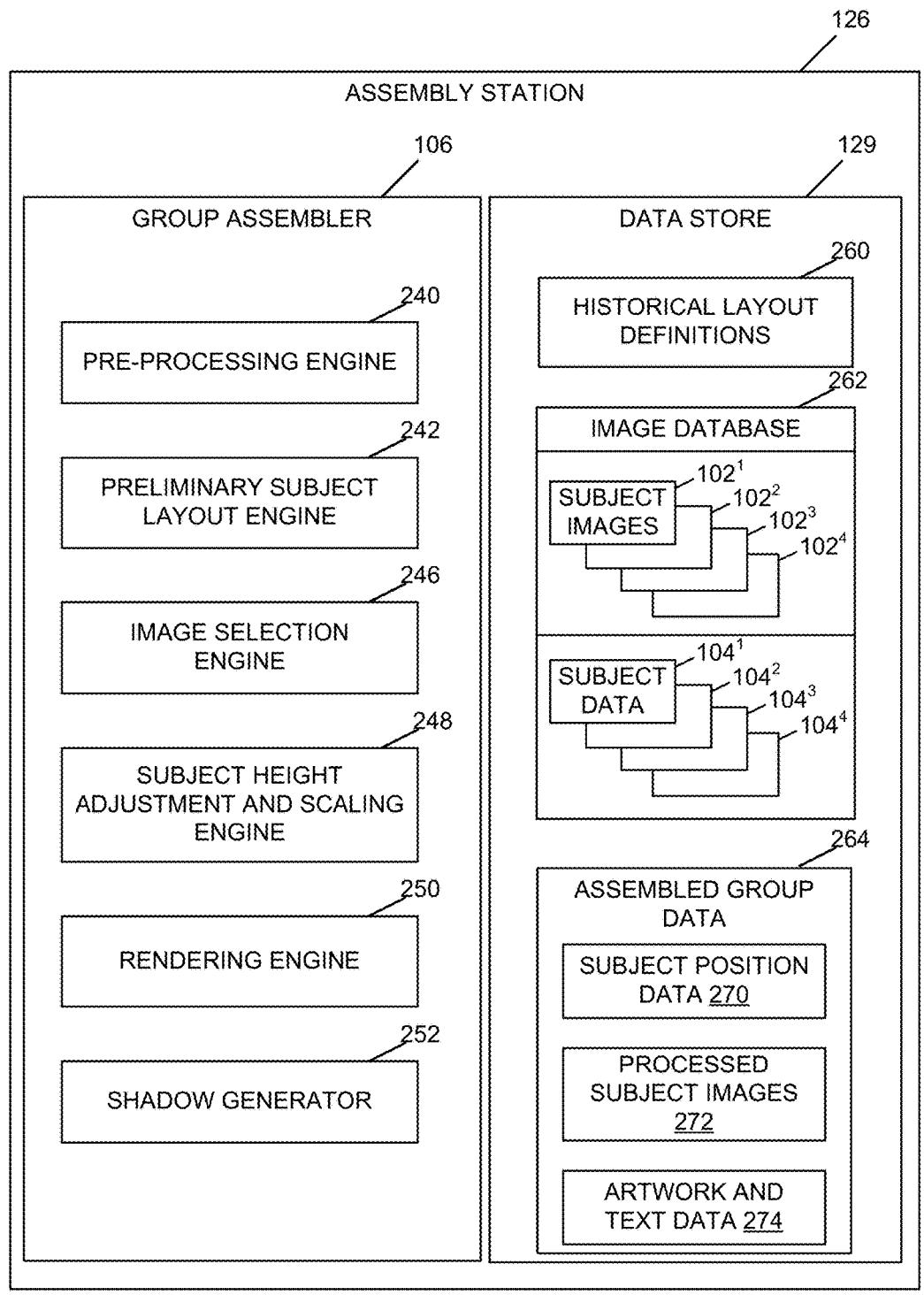
FIG. 6 is a schematic block diagram illustrating an example of an assembly station.

FIG. 6 is a schematic block diagram illustrating an example of the assembly station 126 (shown in FIG. 2). In this example, the assembly station includes the group assembler 106 and the data store 129. This example of the group assembler 106 includes a pre-processing engine 240, a preliminary subject layout engine 242, an image selection engine 246, a subject height adjustment and scaling engine 248, a rendering engine 250, and a shadow generator 252. This example of the data store 129 includes historical layout definitions 260, image database 262 (including subject images 102 and subject data 104), and assembled group data 264 (including subject position data 270, processed subject images 272, and artwork and text data 274.

Each of the components of the exemplary assembly station 126 will be briefly discussed below, followed by more detailed examples that are described with reference to FIGS. 7-17.

The pre-processing engine 240 is provided in some embodiments to perform some initial processing operations on the subject images 102 received from the photography stations 122. The processing can include, for example, color profile adjustments, face finding operations, and lighting adjustment. An example of the pre-processing engine 240 is described in more detail with reference to FIG. 7.

The preliminary subject layout engine 242 operates to define a preliminary layout of the subject images 102 for the assembled group image 108. In some embodiments, the preliminary subject layout data is stored in the historical layout definitions 260, for subsequent reuse by the preliminary subject layout engine 242. An example of the preliminary subject layout engine 242 is described in more detail with reference to FIG. 8-9.

The image selection engine 246 operates to retrieve (or identify) subject images 102 from the image database 262. In some embodiments, the image selection engine 246 receives a request for a subject image 102 from another engine (such as the preliminary subject layout engine 242). The request can include one or more selection criteria. The image selection engine 246 then conducts a search through the subject images 102 and subject data 104 to identify the subject images 102 that match the criteria. The image selection engine 246 then sends a reply including (or identifying) the next subject image 102 matching the criteria. An example of the image selection engine 246 is described in more detail with reference to FIG. 11.

The subject height adjustment and scaling engine 248 operates to select and insert images into the assembled group image 108. In some embodiments, the subject height adjustment and scaling engine 248 makes adjustments to the preliminary subject layout, such as to adjust the subject images 102 based on the subject's height, and to scale the images to make the images appear to be in proper perspective (such that images in the front row are larger than images in the back row). An example of the subject height adjustment and scaling engine 248 is described in more detail with reference to FIG. 12-13.

The rendering engine 250 is provided to generate the assembled group image 108, such as by arranging each of the processed subject images 272 together in a single high quality image, and adding the appropriate artwork and text. An example of the rendering engine 250 is described in more detail with reference to FIG. 14.

The shadow generator 252 is provided to insert shadows. The shadows can be added to simulate various possible lighting scenarios. An example of the shadow generator 252 is described in more detail with reference to FIG. 15-16.

Assembled group data 264 stores data that is used by the group assembler 106. In this example, the assembled group data 264 includes subject position data 270, processed subject images 272, and artwork and text data 274.

The subject position data 270 contains data that identifies the positions where the processed subject images 272 should be arranged within the assembled group image 108. This data is initially defined by the preliminary subject layout engine 242, and subsequently modified by the subject height adjustment and scaling engine 248. The subject position data 270 can also include sizing information from the subject height adjustment and scaling engine 248.

The processed subject images 272 are the final subject images after all processing has been completed. For example, the processed subject images 272 may include color, scale, or lighting adjustments that are made to the subject images 102 that are originally received from the photography stations 122.

Additional artwork and text can be included in the assembled group images 108, and such artwork or text is stored in the artwork and text data 274 in some embodiments. The artwork can include a background art image to be used as the final background of the assembled group image, for example. The artwork can also include logos, graphics, icons, and the like to be included in the assembled group image. Text, such as a name of the group, a year, names of the subjects, etc. can also be included in the assembled group image 108 if desired. The example assembled group image 108 shown in FIG. 1 illustrates one example of an assembled group image 108 including a background art image, a school name, logos, a group identifier ("6$^{th}$ Grade Class"), and the school year.

Figure 7:
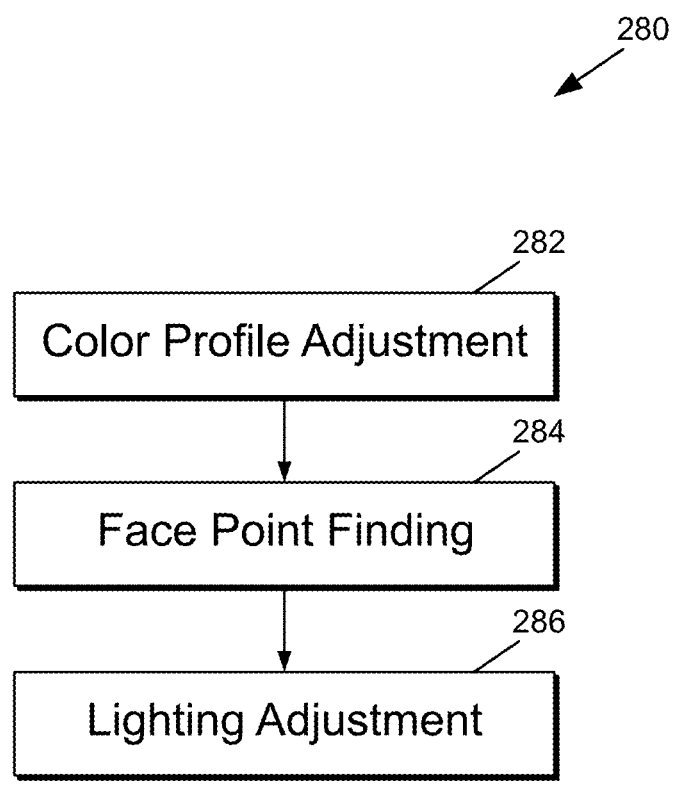
FIG. 7 is a flow chart illustrating an example method of processing subject images.

FIG. 7 is a flow chart illustrating an example method 280 of processing subject images. FIG. 7 is also an example of the operations performed by the pre-processing engine 240, shown in FIG. 6, to modify a subject image 102 received from the photography station 122 (FIG. 1). In this example, method 280 includes operation 282, 284, and 286.

The operation 282 performs a color profile adjustment on the subject image 102. Because the subject images 102 can be captured from multiple different photography stations 122, and may be captured with different cameras 124, the subject images 102 can have different formats. Operation 282 operates to transform each of the subject images 102 from the native color space(s) into a common color space to be used by the group assembler 106. As one example, the subject images 102 are converted into the sRGB (standard red-green-blue) color space.

In some embodiments, the operation 284 is performed to evaluate the subject image to identify face or other body points within the image. In some embodiments, operation 284 utilizes commercially available face finding software. An example of a commercially available face finding software is the VisPro-ware Software Development Kit previously distributed by NextgenID, Inc. of San Antonio, Tex. The operation 284 can find various face points, such as the locations of the eyes, inter-eye center point, top of head, sides of head, chin, mouth, and nose. The operation 284 can also operate to identify body points, such as the locations of body joints (i.e., shoulders, elbows, wrists, fingers, neck, hips, knees, and ankles; and other body points, such as the hands, head, torso, feet, etc. In some embodiments, at least some of these points are determined by the photography station 122, such as the example shown in FIG. 4, and such points are included within the subject data 104, such as shown in FIG. 4.

In some embodiments, body points can include points that are not visible in the subject image. For example, if the subject image depicts the subject only from the waist up, the operation 284 can still be performed to estimate the locations of body points that are not visible in the subject image, such as the locations of the subject's feet, based on the locations of points that are visible within the subject image. The estimation can involve the use of other known information, as well, such as the known height of the subject—which may be provided by the photography station 122, for example, or provided by the group coordinator G.

The operation 286 is performed in some embodiments to adjust the lighting in the subject image. Lighting adjustment can include adjusting the color, saturation, or contrast levels within the subject images so that all subject images have uniform levels, such as to reduce the variation that may be present in the images that may have been captured at different photography stations 122, with different levels.

If the subject images 102 received from the photography stations 122 contain both the subject and the background, the method 280 can also include a background removal operation in some embodiments. For example, if the photography station 122 was used to capture a background illuminated image and a separate foreground illuminated image, the two images can be processed to separate the foreground (subject) from the background. If a green or blue screen is used at the photography station 122, chroma key processing can be used to separate the subject from the background.

The resulting subject images are then stored as processed subject images 272, such as shown in FIG. 6.

Figure 8:
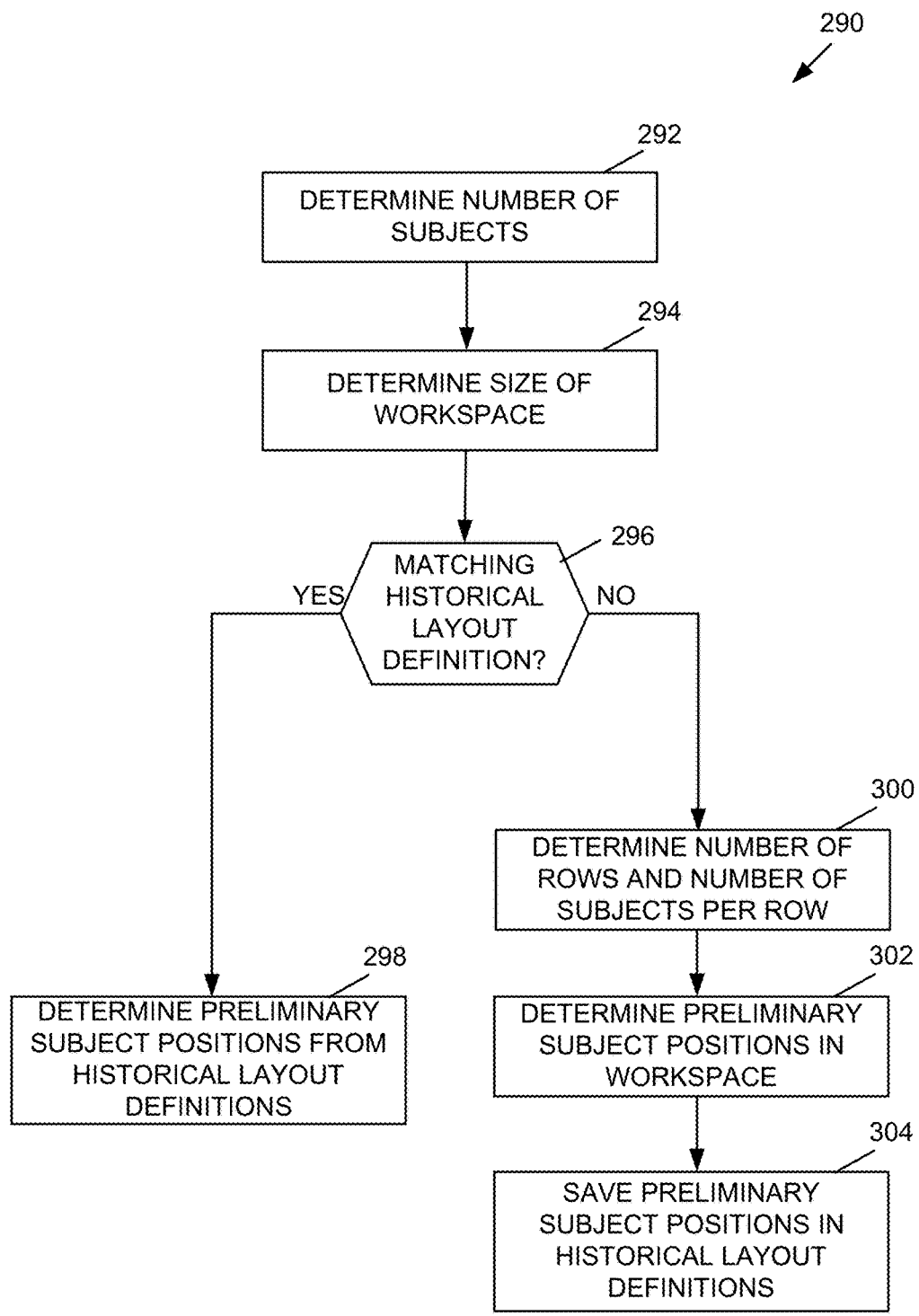
FIG. 8 is a flow chart illustrating an example method of generating preliminary subject positions for an assembled group image.

FIG. 8 is a flow chart illustrating an example method 290 of generating preliminary subject positions for an assembled group image 108. FIG. 8 also illustrates exemplary operations of the preliminary subject layout engine 242, shown in FIG. 6. In this example, the method 290 includes operations 292, 294, 296, 298, 300, 302, and 304.

The operation 292 determines the number of subjects that are to be included within the assembled group image 108. The number of subjects can be input by a user in response to a prompt, or can be automatically determined, such as by determining the number of subjects for which subject images 102 are available in the image database 262. In another possible example, the operation 292 can include identifying the number of subjects that are associated with a group, such as performing a search through subject data 104, to identify the number of subjects that are affiliated with a selected group (a football team, a 6$^{th}$ grade class, etc.).

Figure 9:
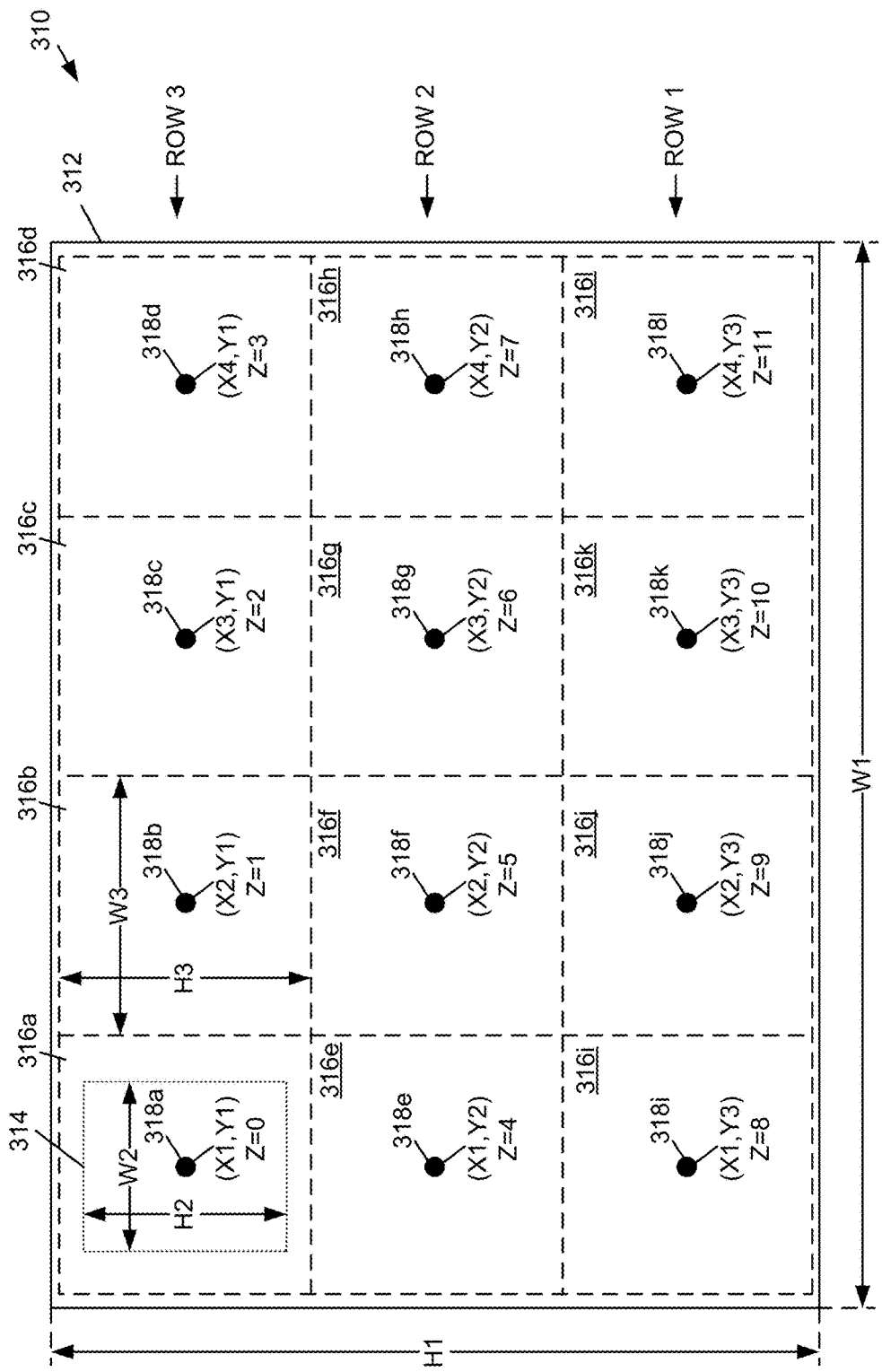
FIG. 9 illustrates an example preliminary subject layout for an assembled group image.

The operation 294 determines the size of the workspace in which assembled group is to be arranged. In some embodiments, the size of the workspace is provided by a user in response to a prompt. The workspace can be defined by a height and a width, or by an aspect ratio, for example. In some embodiments the workspace entered by or selected by the user is limited to the portion in which the subject images will be arranged, while in other embodiments the workspace entered by or selected by the user includes space for additional features, such as borders, text, and the like. Appropriate additions or subtractions can be made in order to identify the size of the workspace that will be needed for the images, not including the additional features. It should be noted that although a rectangular workspace will often be used, and will be shown in the examples used herein, the workspace can be defined as having any shape, including a circle, diamond, triangle, or any other shape. An exemplary workspace is shown in FIG. 9.

The operation 296 is performed in some embodiments to determine whether a historical layout definition has previously been generated by the preliminary subject layout engine 242 and is already saved in historical layout definitions 260. In some embodiments, the operation 296 checks the historical layout definitions 260 to determine whether a historical layout definition has previously been generated for the same number of subjects determined in operation 292, and for the same sized workspace determined in operation 294.

If the historical layout definition exists, operation 298 is performed to determine preliminary subject positions from the historical layout definitions 260. If not, the preliminary subject positions are determined in operations 300 and 302.

In some embodiments, there may be many historical layout definitions that have been previously generated for a given number of subjects and a given workspace size. The operation 298 can operate to evaluate multiple of the past assemblies to identify the preliminary subject positions to be used in the assembled group image 108.

For example, operation 298 may begin by identifying a set of past assemblies (e.g., 10), and identifying the number of rows and number of subjects per row most commonly used in the set of past assemblies. Then, the head positions of the set of past assemblies can be evaluated to identify the average head positions for each subject, and use these head positions as the preliminary subject positions.

In the operation 300, the number of subjects and size of the workspace are considered to determine the appropriate number of rows and appropriate number of subjects to include in each row of the assembled group image 108.

In some embodiments, the number of rows is determined using the following equations:

$$\text{workspace width }(W1) = (\# \text{ of subjects per row} - 1) \times (\text{ratio of head space to head size } X) \qquad \text{Equation 1:}$$

where the ratio of head space to head size is a constant equal to the ratio of W3 to W2.

$$\text{workspace height }(H1) = (\# \text{ of rows} - 1) \times (\text{ratio of head space to head size } Y) \qquad \text{Equation 2:}$$

Where the ratio of head space to head size is a constant equal to the ratio of H3 to H2.

$$\# \text{ of subjects per row} = \# \text{ of subjects}/\# \text{ of rows} \qquad \text{Equation 3:}$$

The workspace width (W1), workspace height (H1), width multiplication factor (A), height multiplication factor (B), and head width (W2) and head height (H2) are illustrated and described with reference to FIG. 9. The height (A) and width (B) multiplication factors define the desired ratios between the preliminary subject location 316 size and the subject head size 314, to provide an appropriate amount of space between adjacent subjects.

In the Equations 1-3, there are three unknown variables. Accordingly, the three equations can be used to determine the number of rows, and number of subjects per row.

In some situations, the number of subjects is not evenly divisible by the number of rows, and therefore the number of subjects in each row will not be uniform. Further, in some embodiments the number of subjects per row is intentionally selected to vary between two or more of the rows. In fact, the aesthetics may be improved by not having uniform numbers of subjects in each row. Once the initial number of subjects per row is determined, as noted above, modifications can be made to alter the actual number of subjects to be included in each of the rows, as desired.

In some embodiments, it is desired that all of the subject's head positions (defined by the head center points 318) be staggered from heads in adjacent rows. For example, the following process is used in some embodiments to determine the number of subjects in each row. This process can be used, for example, when the number of people in the group is even, and the number of rows is even.

An operation is performed to determine the ideal number of people per row. For example, the total number of people is divided by the number of rows.

Figure 10:
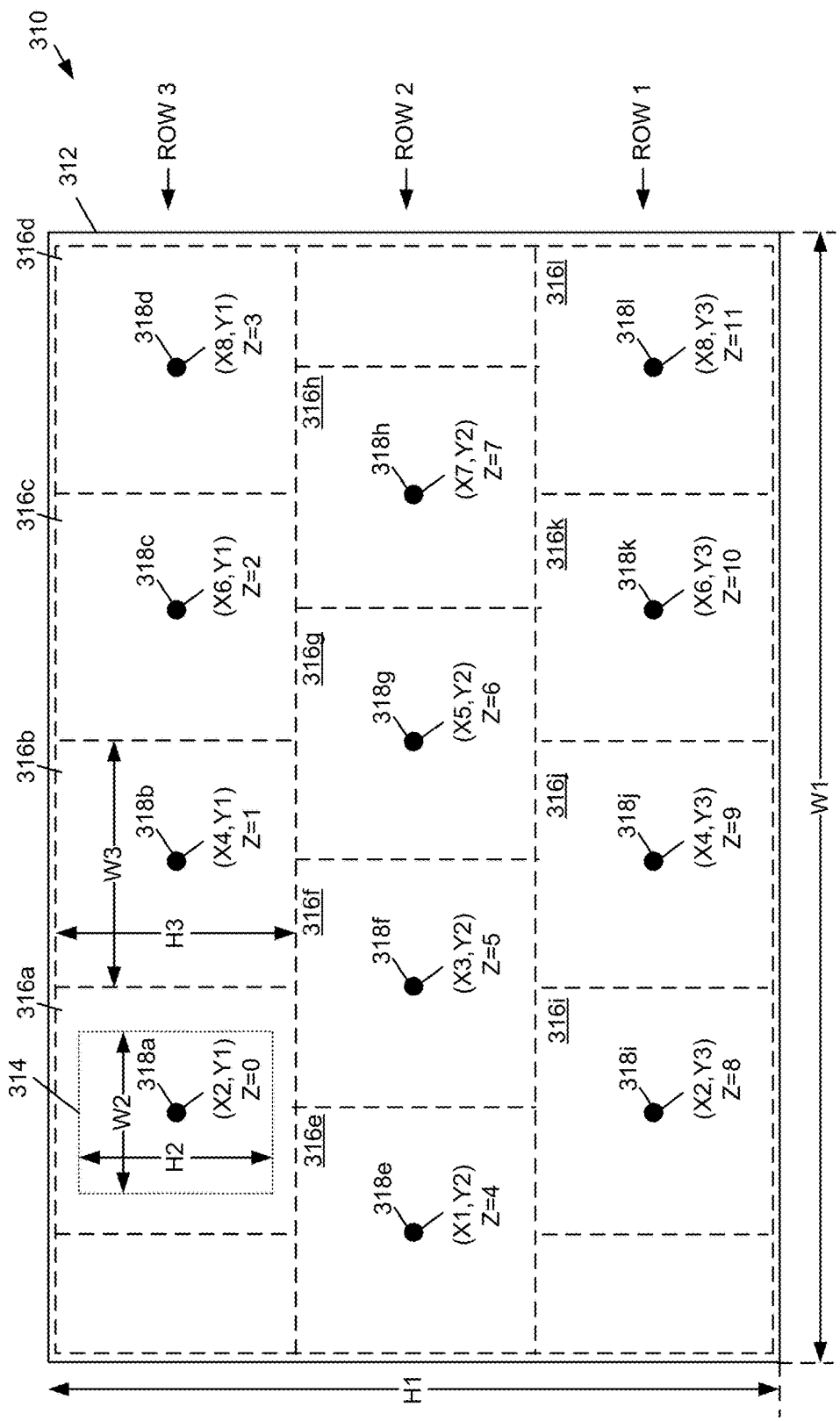
FIG. 10 illustrates another example preliminary subject layout for an assembled group image.

If the resulting number is an integer, then an operation is performed to place the same number of people in each row, and stagger each row back and forth in the horizontal dimension to make the heads stagger (an example is shown in FIG. 10).

If the resulting number is not an integer, then an operation is performed to round up to the next higher integer. That number of subjects is then placed in the first row. The operation is repeated (dividing the remaining number of people by the remaining number of rows, and placing the next higher integer in each row) until the last row is reached. All remaining subjects are arranged in the last row.

This process places the largest number of people in the front row, and each successive row will have the same number of people, or at most one fewer, than the row in front of it.

In some embodiments, in addition to staggering the head positions in adjacent rows, it is further desired that each row be centered in the workspace 312. For example, the following additional operations are performed in some embodiments to determine the number of subjects per row.

An operation is performed to arrange the subjects so that the number of subjects per row alternates between an even and an odd number. For example, if the first row starts with an even number of people, the second row will start with an odd number of people. This continues until the last row is reached. If the first row starts with an odd number, the second row will start with an even number. Multiple solutions can therefore be determined—one beginning with an even number in the first row, and one beginning with an odd number in the first row. When the last row is reached, if it has an even number of people and the row in front of it does, too, then the arrangement is considered invalid. Similarly, if the last two rows both contain an odd number of people, then the solution is determined to be invalid.

Another set of possible arrangements is then considered. In this operation, the number of subjects per row is again determined, first using a larger number of people in the first row, with a smaller number in the second row; and then starting with a smaller number in the front row, and a larger number in the second row. Two additional arrangements are therefore determined. The arrangements are again evaluated to determine whether the last two rows both contain an odd number, or an even number, of subjects, and if so, that arrangement is determined to be invalid. These operations can result in up to four valid arrangements.

The valid arrangements are then evaluated to identify the preferred arrangement. In one example, the arrangements are each evaluated to determine the difference between the numbers of people in the front and back rows. An arrangement having the smallest difference is preferred over arrangements having larger differences.

The process discussed above gives the following exemplary results. If 12 people are to be arranged in 2 rows, both rows will contain 6 people. If 13 people are to be arranged in 2 rows, the first row will contain 7 people, and the second row will contain 6 people. If 12 people are to be arranged in 3 rows, the first row will contain 5 people, the second row will contain 4 people, and the third row will contain 3 people. If 13 people are to be arranged in 3 rows, the first row will contain 4 people, the second row will contain 5 people, and the third row will contain 4 people. Other embodiments use other subject number selection processes, and can result in other arrangements.

The operation 302 is performed to determine the preliminary subject positions within the workspace. Once the number of rows and number of subjects per row has been determined, the preliminary subject positions can be defined by preliminary head center points, which can be calculated. The preliminary subject positions are often selected to distribute subjects evenly throughout the workspace, although an even distribution is not required. Layout rules can be defined (or can be input by a user, such as the group coordinator G, shown in FIG. 2, or another user) to customize the preliminary layout positions, in some embodiments.

The operation 304 is performed to save the preliminary subject positions in the historical layout definitions 260 (shown in FIG. 6).

FIG. 9 illustrates an example preliminary subject layout 310 for an assembled group image, such as generated by the preliminary subject layout engine 242 (FIG. 6) using the method 290 (FIG. 8). FIG. 9 depicts the preliminary subject layout 310 for a workspace 312. The preliminary subject layout 310 includes preliminary subject positions 316 and preliminary head center points 318. The dimensions of the average head size 314 are also illustrated in FIG. 9.

In this example, the workspace 312 has a width W1 and a height H1 (and therefore an aspect ratio of W1:H1). Also, in this example a determination has been made that there are a total of twelve subject images that are to be arranged within the workspace 312.

It is typically desired that there be space between adjacent images in a given row. As a result, the actual head sizes 314 are selected to be smaller than the preliminary subject positions. The width W3 can be determined by dividing the total width (W1) of the workspace 312, by the number of subjects for the given row. Similarly, the height H3 can be determined by dividing the total height (H1) of the workspace 312 by the number of rows.

Once the preliminary subject position sizes are known, the head sizes 314 can be determined using defined height (A) and width (B) multiplication factors according to the following equations:

$$H2=H3/A \qquad \text{Equation 4:}$$

$$W2=W3/B \qquad \text{Equation 5:}$$

In some embodiments, the height multiplication factor (A) is in a range from about 1.1 to about 1.5, such as about 1.25. A height multiplication factor (A) of 1 would position the bottoms of the subject's heads in row 3 at approximately the same location as the tops of the subject's heads in row 2, for example. A height multiplication factor (A) of greater than 1 provides additional vertical spacing between the subjects in adjacent rows. A height multiplication factor (A) of less than one results in overlap between subject's heads in adjacent rows.

In some embodiments, the width multiplication factor (B) is in a range from about 1.2 to about 1.8, such as about 1.5. A width multiplication factor (B) of 1 would result in no horizontal space between the subject's heads in a given row. A width multiplication factor (B) of greater than 1 provides additional horizontal spacing between the subjects that are in the same row. A width multiplication factor (B) of less than one results in overlap between adjacent subject's heads.

In some embodiments, the process operates to identify the number of rows and number of subjects per row that results in the least amount of unused space in workspace 312. For example, while it would be possible to arrange all twelve of the preliminary subject positions 316 in a single row, the images would have to be scaled to approximately 1/12 of the width W1. This would result in a large area of workspace 312 above and/or below the preliminary subject positions 316 that would be unused. The same would be true if each preliminary subject position 316 was placed in its own row, such that the images would have to be scaled to approximately 1/12 of the height H1 of workspace 112.

In the example shown in FIG. 9, it is determined that the workspace 112 can be most fully utilized by arranging the preliminary subject positions in three rows (including rows 1, 2, and 3), with four preliminary subject positions in each row.

Although the workspace 312 is illustrated as having a single rectangular shape, in other possible embodiments the workspace 312 can have any shape, and may even include multiple sections. Whatever the size and shape of the workspace, preliminary subject positions 316 are identified to best arrange the desired number of subject images within that space. Further, the arrangement can be determined based on one or more layout rules. The height (A) and width (B) multiplication factors are examples of layout rules, which influence the amount of spacing provided between the subjects. Other layout rules can also be provided, such as a predefined number of rows, or number of subject's per row. In some embodiments, the layout rules are received from a customer or the group coordinator G, as part of the other order information.

Once the number of rows and number of preliminary subject positions 316 to be included in each of the rows has been determined, the specific positions of each of the preliminary subject positions 316($a$-1) are determined for the workspace 312. In some embodiments, the identification of the positions involves the computation of a center point 318($a$-1) for each preliminary subject position 316($a$-1). The center point 318 is defined by coordinates (X,Y), in some embodiments, such as based on a number of horizontal (X) and vertical (Y) pixels from an origin (such as at the top left of the workspace 312). In this example, the preliminary subject positions 316 are arranged side-by-side and vertically and horizontally centered in the workspace 312, leaving a small margin of unused spaced adjacent the perimeter of workspace 312.

A first preliminary subject position 316$a$ is defined, for example, near the upper left corner of the workspace 312. A center point 318$a$ is identified having coordinates (X1,Y1). The coordinate X1 is computed as one half of the width W3 of the preliminary subject position 316$a$, plus the width of the unused margin space to the left of the preliminary subject position 316$a$. The coordinate Y1 is similarly computed as one half of the height H3, plus the height of the unused margin space to the top of the preliminary subject position 316$a$. In some embodiments, the point 318 is shifted from the center.

The other center points 318 are also computed. For example, because in this example a horizontal space between adjacent center points (e.g., 318$a$ and 318$b$) is equal to the width W3, the center point 318$b$ can be computed, where the Y-coordinate is Y1, and where X2=X1+W3. The center point 318$e$ is computed, where the X-coordinate is X1, and where Y2=Y1+H3. The remaining center points 318 are similarly computed.

In some embodiments, the final row positions are determined as follows. First, the vertical position of the bottom row is determined. The scale of the front row of people is set by the desired head size, which has already been calculated. The vertical position of the front row is then placed such that the subjects are visible from about mid-thigh up. Next, the bottom of the next row is positioned a distance (H3) above that location. Each subsequent row is similarly positioned above the bottom of the previous row. However, in some embodiments a scaling factor is applied, as discussed in more detail herein. For example, if a scaling factor reduces the size of each row by 3%, the distance (H3) can be multiplied by 0.97 to determine a scaled position for the bottom of each subsequent row above the previous row.

In some embodiments, the preliminary subject positions 316 also include a z-order. The z-order defines a priority of images in the event of overlap, where a preliminary subject position (e.g., 316$a$) having a lower z-order (e.g., Z=0) will be hidden by any portion of another image in a preliminary subject position (e.g., 316b) having a higher z-order (e.g., Z=1). The z-order provides the appearance of certain subjects being arranged forward of other subjects in the final assembled group image 108. Typically the preliminary subject positions 316 that are arranged in vertically lower rows (e.g., row 1) will have a z-order that is higher than the z-order of preliminary subject positions 316 that are arranged in vertically higher rows (e.g., rows 2 or 3), to make the subjects in row 1 appear to be in front of subjects in rows 2 and 3.

Once the preliminary subject positions 316 have been determined for the workspace 312, data defining the preliminary subject positions 316 is stored in a computer readable storage device. In some embodiments, the data is saved as historical layout definitions for subsequent use. As one example, the data stored can include one or more of the following: the size (H1 and W1) of the workspace 312, the aspect ratio (H1:W1) of the workspace 312, the number of preliminary subject positions (e.g., number of subject images that can be) included in the workspace, the size (H2 and W2) of the average head sizes (H2 and W2) 314, the aspect ratio (H2:W2) of the average head sizes 314, the height (A) and width (B) multiplication factors, the size (H3 and W3) of the preliminary subject positions, the aspect ratio (H3:W3) of the preliminary subject positions, and the center points 318 of the preliminary subject positions 316.

Once the preliminary subject positions 316 have been generated and saved, in some embodiments they are made available for reuse as historical layout definitions 260 (shown in FIG. 6). An example of this process is illustrated and described in FIG. 8, with reference to operations 296, and 298. As one example, if another request is subsequently made having a similar aspect ratio and shape (e.g., rectangular, circular, etc.), and requesting that the same or a similar number of subject images be included in the workspace, the preliminary subject positions 316 can be retrieved from the historical layout definitions 260 and reused so that the computations described herein do not have to be repeated each time. It should be noted that in some embodiments the preliminary subject positions 316 are defined without regard to the specific images to be inserted at those locations (other than the average head sizes of all of the subject images). Accordingly, no image-specific adjustments have been made to the preliminary subject positions 316 at this point, permitting the data to be more easily reused with a different set of images.

FIG. 10 illustrates another example preliminary subject layout 310 for an assembled group image. This example is the same as the example shown in FIG. 9, except that the preliminary subject positions 316 (and preliminary head center points 318) are offset in adjacent rows. Offset positions can improve the aesthetics of the assembled group image 108 and make the image 108 appear more natural.

The offset preliminary subject positions require more space within the workspace 312, because of the unused space (e.g., toward the left in rows 1 and 3, and toward the right in row 2). As a result, equations similar to equations 1-3 can be modified accordingly to compute the number of rows and number of subjects per row.

In some embodiments, after the preliminary subject positions have been determined, the rows are centered in the workspace 312 to provide substantially equal margins on the left and the right sides. To do so, an offset is calculated that is needed to make the left and right margins equal for that row. That offset is then applied to every person in the group, so that the entire group appears centered in the workspace 312.

Figure 11:
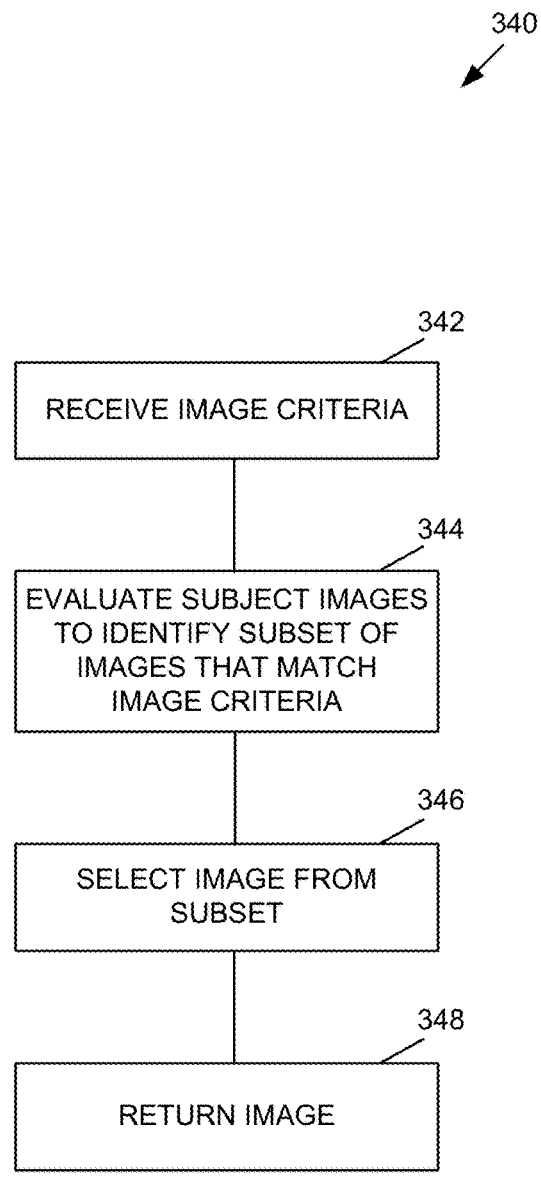
FIG. 11 is a flow chart illustrating an example method of selecting subject images from an image database.

FIG. 11 is a flow chart illustrating an example method 340 of selecting subject images 102 from an image database. FIG. 11 also illustrates example operations of the image selection engine 246, shown in FIG. 6.

In some embodiments, the group assembler, such as shown in FIG. 6, includes an image selection engine 246 that is used to identify and select an appropriate subject image from the multiple available subject images 102 stored in the image database 262. For example, the subject height adjustment and scaling engine 248 can be used to submit a request to the image selection engine 246 identifying image criteria for the next subject image. The image selection engine 246 then processes the request as shown in FIG. 11, and returns an appropriate subject image for further use by the subject height adjustment and scaling engine 248.

In the example shown in FIG. 11, the method 340 includes operations 342, 344, 346, and 348.

Operation 342 is performed to receive the image criteria. The image criteria can specify one or more criteria for the next image to be returned. The most basic criterion would simply be a request for the next image, which permits the image selection engine 246 to determine on its own which of the images should be provided. In other cases, however, the image criteria can specify particular characteristics of the desired next image. One example of such a characteristic is a particular subject pose, such as a pose in which the subject is facing toward the right. It may look awkward for a subject arranged at the left side of an image to be facing away from the group, for example, and therefore the image criteria can request that an image be provided in which the subject is facing to the right—toward the rest of the group. Poses can specify any position or arrangement of the subject, such as the direction that the subject is facing, the position of the subject's arms (e.g., folded, straight, bent), and the like. Alternatively, the image criteria can include criteria relating to the subject in the image. For example, the image criteria can request an image of the next subject by player number on the football team, an image of the next subject according to an alphabetical order, or an image of the next subject according to a height order (e.g., tallest to shortest, or shortest to tallest).

Operation 344 is then performed to evaluate the subject images 102 to identify a subset of the images that match the image criteria. In some embodiments, operation 344 utilizes subject data 104 to determine whether subject images 102 match the image criteria, by comparing the image criteria to data stored in the subject data 104 associated with each image. For example, a search is conducted to identify all subjects having a desired pose. As another example, a search is conducted to identify all subjects on the football game having an assigned player number. If multiple criteria are specified, operation 344 identifies the subset of images 102 that match the multiple criteria.

Operation 346 is performed to select an image from the subset of images that match the criteria. In some embodiments, one or more rules are defined that permit the selection of a single subject image 102 in the event that multiple possible subject images 102 are available that match the image criteria. For example, the rule can specify that subject images 102 be processed according to a predetermined order, such as alphabetically by name, chronologically by date and time the image was taken, consecutively by subject identifier, player number, relative height, or image number. In yet another embodiment, the image is randomly selected from the subset of images.

Operation 348 is performed to return the image selected in operation 346. In some embodiments, returning the image involves retrieving a copy of the subject image 102 from the image database 262 (FIG. 6). In other embodiments, the operation returns an image identifier, which permits the subject image 102 to be uniquely identified and subsequently accessed from the image database 262.

Figure 12:
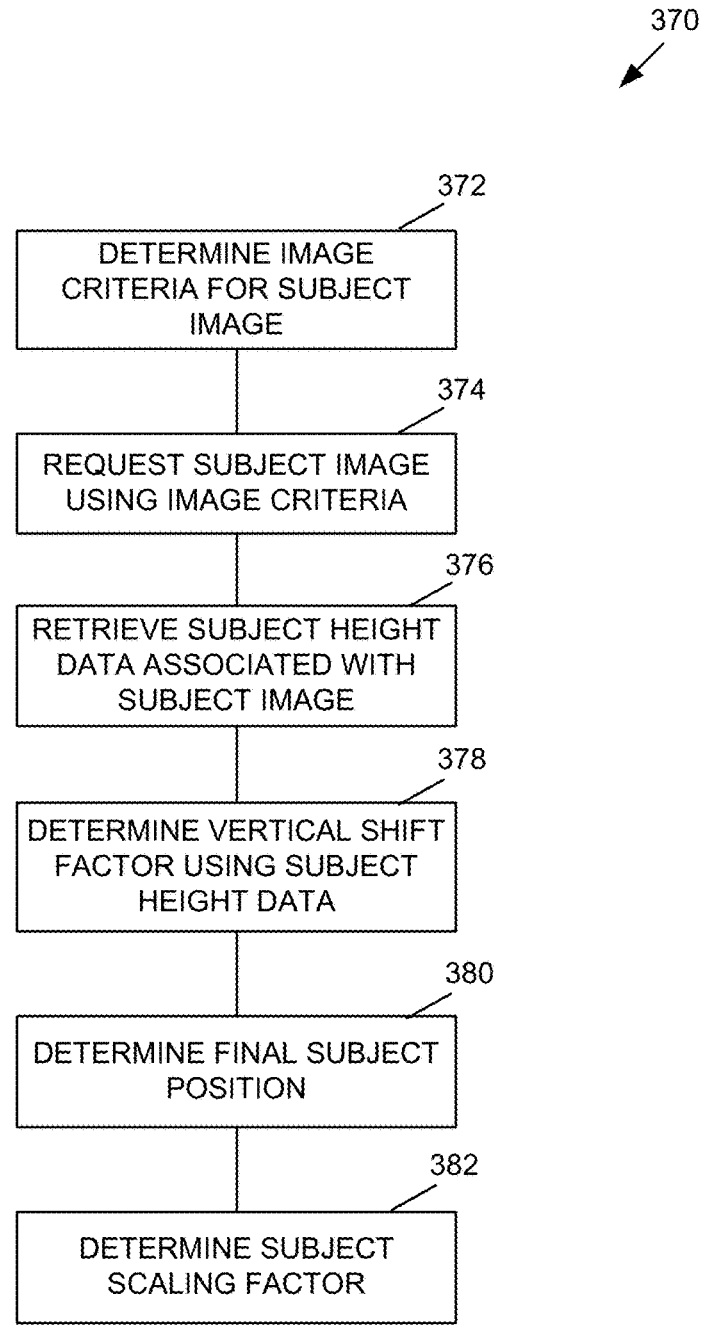
FIG. 12 is a flow chart illustrating an example method of placing subject images into an assembled group image.

FIG. 12 is a flow chart illustrating an example method 370 of placing subject images 102 into an assembled group image 108. FIG. 12 also illustrates exemplary operations of the subject height adjustment and scaling engine 248, shown in FIG. 6. In this example, the method 370 includes operations 372, 374, 376, 378, 380, and 382.

In some embodiments, the method 370 is repeated for each subject image that is included within an assembled group image 108.

Operation 372 is performed to determine image criteria for a subject image, such as based on the location of the corresponding preliminary subject position 316 in the workspace 312 (as shown in FIG. 9), such as to request a subject having a desired pose. As another example, the operation 382 is performed to determine image criteria based on what other subject images have already been processed for the group assembled image, such as to request the subject having the next name in the alphabet, or the next player number.

Operation 374 is then performed to request a subject image that matches the image criteria. For example, a request identifying the image criteria is sent to the image selection engine 246, which returns a subject image matching the image criteria, as described with reference to FIG. 11.

Once the subject image 102 is identified in operation 374, the subject data 104 corresponding to the subject in the subject image 102 can also be identified. In some embodiments, operation 376 is performed to retrieve subject height data associated with the subject in the subject image 102. The subject height data provides an indication of how tall the particular subject is. As discussed herein, the subject height data can be data provided by the subject or other person with access to such information (such as the group coordinator G), or can alternatively be measured at the time that the subject image 102 is captured using the depth and position detection device 140. For example, the height data can be obtained from physical measurements, or from a record such as a team roster containing such physical statistics of the players on the team. In yet another possible embodiment, the subject height data identifies a relative height of the subject (in contrast to an actual physical height measurement) with respect to the other subjects or to an average subject.

Operation 378 then determines a vertical shift factor using the subject height data. The vertical shift factor is a distance (such as measured in pixels) that the subject's image should be shifted upward or downward so as to accurately represent the subject's height as compared with other subjects in the assembled group image 108. Because it is unlikely that all subjects would have exactly the same height, it is desirable to adjust the preliminary subject positions 316 (and more specifically, the center points 318) shown in FIG. 9 so that the subject images are shown having the appropriate height. An example is illustrated and described in more detail with reference to FIG. 14, in which a subject having a height greater than the average height has been assigned to the preliminary subject position 316a, while a subject with less than average height has been assigned to the preliminary subject position 316b.

In another possible embodiment, the height differences between subjects is scaled to reduce the magnitude of height variations. This can improve the aesthetics of the image, particularly if large height differences exist between subjects in the same row, while still accurately depicting (proportionally) whether certain subjects are taller or shorter than others within a given row. For example, the height difference can be scaled by 0.5 (such that the apparent difference in height is ½ of the actual height difference). Any other scaling factor between 0 and 1 can be used in other embodiments.

Figure 13:
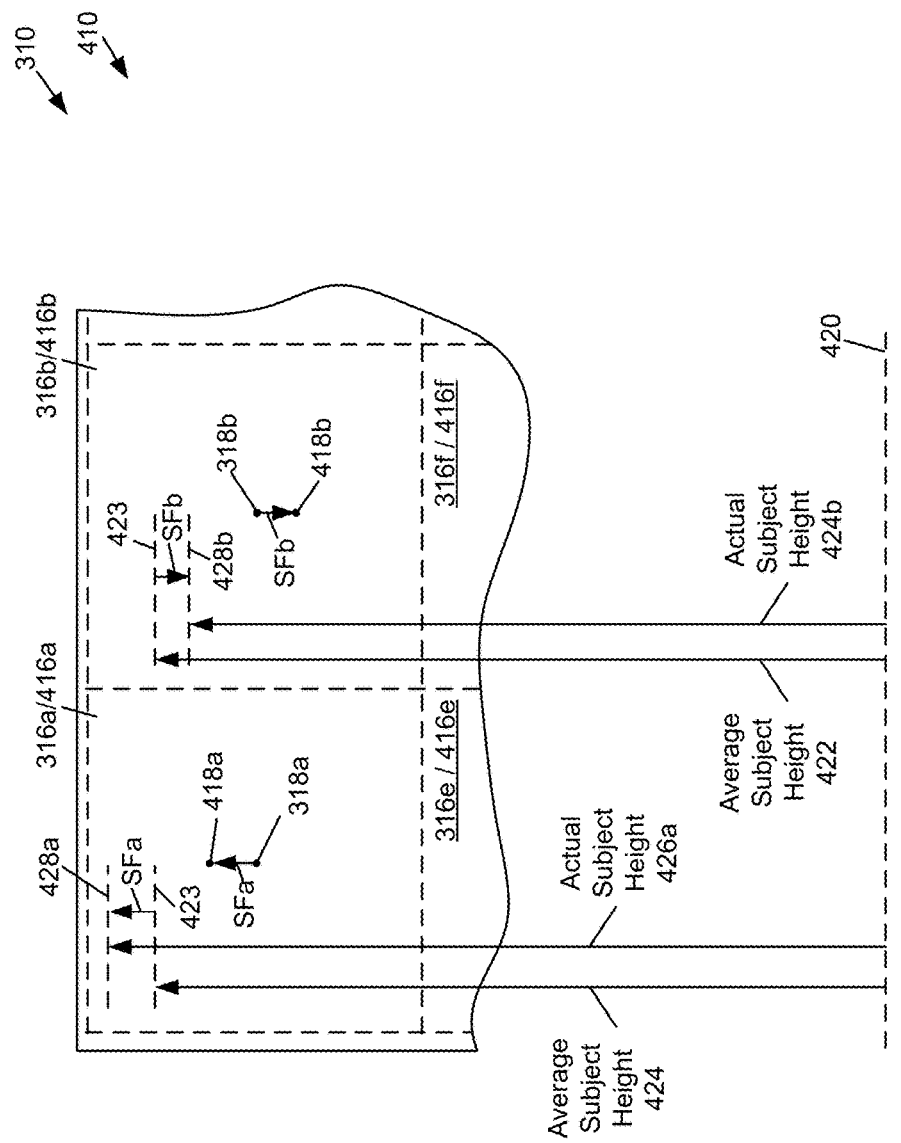
FIG. 13 illustrates an example method of determining a vertical shift factor using subject height data.

Final subject positions are then determined in operation 380 using the vertical shift factor of operation 378, as also shown in FIG. 13.

In some embodiments an operation 382 is also performed to determine a subject scaling factor for each of the subject images 102. The operation 382 is performed to define an appropriate scaling factor to be applied to subject images 102 so that subject images in the upper rows look at least slightly smaller than subjects in the lower rows, giving the appearance that the subjects in the lower rows are closer than subjects in the higher rows. Referring to the example of FIG. 9, scaling factors are assigned so that subjects in row 1 appear slightly larger than subjects in row 2. Similarly, scaling factors are assigned so that subjects in row 2 appear slightly larger than subjects in row 3.

As one example, a base scaling factor in a range from about −1% to about −5% is applied to images in adjacent rows. For example, a scaling factor of −3% can be applied to the subject images in row 2, while a scaling factor of −6% (twice the base scaling factor) is applied to images in row 3. Alternatively, images in rows 1 can be assigned a scaling factor of +6% and images in row 2 can be assigned a scaling factor of +3%. As another alternative, images in row 3 can be assigned a scaling factor of −3% and images in row 1 can be assigned a scaling factor of +3%.

Final subject position data is then typically stored in a computer readable storage device for each subject image 102. As one example, the final subject position data stored can include any one or more of the items of data stored for the preliminary subject positions, as well as one or more of: the final subject image positions, the vertical shift factor for each subject, the scaling factor for each subject, identifiers for each subject image 102 selected from the database, and copies of the subject images 102.

FIG. 13 illustrates an example method of determining a vertical shift factor using subject height data. FIG. 13 also illustrates an example of operation 378, shown in FIG. 12. The method involves the use of preliminary subject layout 310 (described with reference to FIG. 9) and subject height data, to determine appropriate shift factors and generate the final subject layout 410 using the shift factors.

In this example, the preliminary subject layout 310 includes the preliminary subject positions 316(a,b,e,f) and center points 318(a,b). The final subject layout 410 further includes final subject positions 416(a,b,e,f) and center of head points 418(a,b). A projected ground location 420, an average subject height 422, and actual subject heights 424(a,b) are also illustrated in FIG. 13.

The preliminary subject layout 310 includes preliminary subject positions 316(a,b,e,f) that identify the location that a subject having an average height should be inserted into the final assembled group image 108 (FIG. 1). More specifically, center points 318(a,b) are provided in some embodiments, which identify the precise location that a center of the subject's head may be placed.

Because the subjects are not all the same height, it would look unnatural for all of the subjects to be inserted at the same height in the assembled group image 108. Accordingly, the preliminary subject positions 316(a,b) and associated center points (318a,b) can be shifted for each subject. The magnitude of the shift is referred to herein as the shift factor (SF).

The shift factor can be determined in a number of ways. For example, the shift factor can be generated randomly for each subject. In another embodiment, the shift factor is computed based at least in part on one or more known characteristics of the subject, such as the subject's gender, age, grade, or the like. For example, a subject that is known to be a male, older, or in a higher grade, may be assigned a larger shift factor than subjects that do not have these characteristics.

A more accurate way to depict the subject's height, however, is to utilize subject height data. Knowing the subject's height, a shift factor can be computed that accurately represents the subject's height compared with other subjects in the assembled group image 108.

An exemplary process of computing the shift factor is illustrated in FIG. 13. To begin, recall that in some embodiments the preliminary subject positions 316(a,b) and associated center points 318(a,b) are initially computed for an average subject having an average head size and an average height, without adjustment for any particular subject's characteristics.

As a result of this, an average top of head location 423 can be computed as a location above the center of head point 418 a distance one-half of the average head height.

The average subject height 422 can then be used to determine the location of a projected ground location 420, which can be used for all subjects in a given row. The projected ground location 420 is simply a coordinate or other location identifier utilized for ease of computation. In fact, the projected ground location 420 may often represent a location outside of the boundaries of the workspace 312.

Once the projected ground location 420 has been determined, the actual subject height data 426 for one or more subjects can be used to compute the appropriate shift factors. In this example, the subject assigned to preliminary subject position 316a is determined to have an actual subject height 426a. Accordingly, the actual top of head location 428a is determined to be that distance (the actual subject height 426a distance) above the projected ground location 420. The shift factor SFa for this subject is then computed, such as by computing the distance between the average top of head location 423 and the actual top of head location 428a. The same shift factor SFa can then be used to determine a final center of head point 418a, which is shifted a distance from the preliminary center point 318a equal to the shift factor.

The same process can be repeated for additional subjects and subject positions in the same or other rows. For example, the second subject assigned to preliminary subject position 316b can be evaluated. Because the preliminary subject position 316b is in the same row as the preliminary subject position 316a, the same average subject height 422 and projected ground location 420 can be used. The actual subject height 424b is then determined to compute the actual top of head location 428b for the subject. The shift factor SFb is then computed as the difference between the actual subject height 424b and the average subject height 422. In this example, the actual subject is shorter than the average, and therefore a negative shift factor is assigned. The final center of head point 418b is therefore shifted down from the preliminary center point 318b by a distance equal to the shift factor SFb.

The projected ground location 420 is recomputed for each row of subjects, such as to give the appearance that each row of subjects is standing on a different tier of an elevated platform, for example.

The final subject layout 410 is stored in a computer readable storage device. In some embodiments, the final subject layout 410 includes some or all of the data from the preliminary subject layout 310. The final subject layout 410 also includes one or more of the final subject positions 416 and final center of head points 418.

Figure 14:
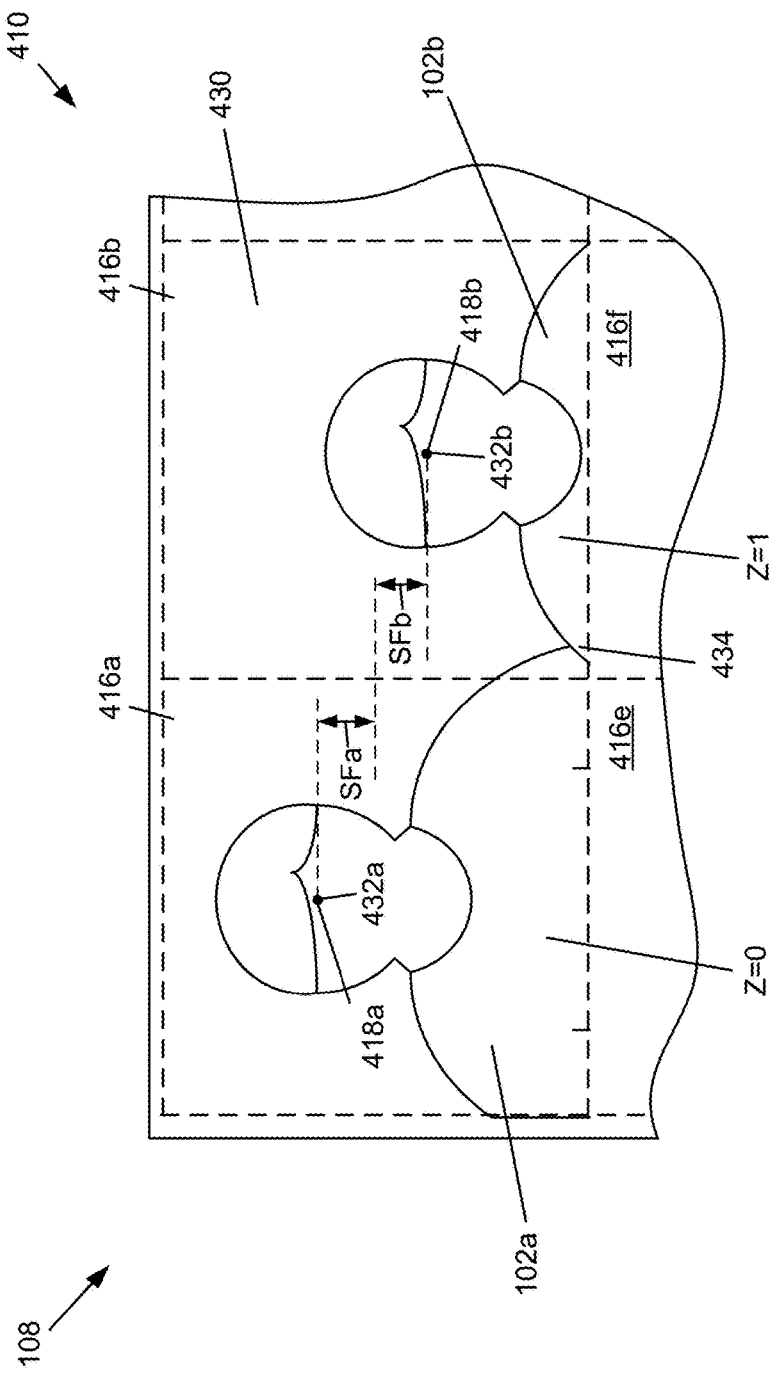
FIG. 14 illustrates an example method of generating an assembled group image.

FIG. 14 illustrates an example method of generating an assembled group image 108. FIG. 14 also illustrates an example of the operation of the rendering engine 250, shown in FIG. 6.

In this example, the assembled group image is compiled by inserting at least portions of the subject images 102(a,b) onto a background art image 430, using the final subject layout 410, including the final subject positions 416(a,b) and center of head points 418(a,b). Only a portion of the assembled group image 108 is shown in FIG. 14 for ease of illustration.

The subject images 102 are retrieved, such as from the database 262 or from the processed subject images 272 (both shown in FIG. 6). Preferably, the subject images 102 are separated from an original background, such that they only contain an image of the subject.

Each subject image 102 is identified and is arranged into the assembled group image 108 using the final subject layout 410. For example, the subject image 102a is first identified, and a center of head point 432a for the subject image 102a is determined. The center of head point 432a can be retrieved from the subject data 104, subject position data 270, or can be located using face finding software, for example. The subject image 102a is then arranged in the assembled group image 108 by aligning the center of head point 432a with the center of head point 418a of final subject position 416a.

All subjects are arranged in the assembled group image 108 in a similar manner. For example, the second subject image 102b is arranged by aligning the center of head point 432b with the center of head point 418b of final subject position 416b.

Because the final subject positions 416(a,b) and associated center points 432(a,b) are shifted by shift factors SF(a,b), the subject images 102(a,b) are also shifted by the shift factor. For example, subject image 102a is shifted up by the shift factor SFa, and subject image 102b is shifted down by the shift factor SFb, representing the actual differences in height between the subjects.

The z-order for each of the final subject layout 410 is used to determine which subject image 102 should have priority in the event of overlap. In this example, the final subject position 416b has a higher z-order (e.g., Z=1) than the final subject position 416a (e.g., Z=0). As a result, the subject image 102b is given priority in the region of overlap 434 between the subject images 102a and 102b, and a portion of the subject image 102a appears to be hidden behind subject image 102b.

The process is repeated for all subject images 102, until the entire assembled group image 108 has been compiled. The background art image 430 can be added at any point during the process. For example, in some embodiments the subject images 102 are inserted into the background art image 430, while in other embodiments the background art image 430 is inserted after the subject images 102 have been arranged. In yet another possible embodiment, the background art image is not included.

The assembled group image 108 is saved in a computer readable storage device.

In some embodiments the subject images 102 may have relative size variations. For example, one subject image may have been taken with a different focal length than another subject, such that one subject may be disproportionally sized as compared with the other subject. If so, additional processing can be performed to put the subject images into the proper proportions.

One way to automatically evaluate the relative proportions is to determine the distance between the centers of the eyes for each subject image. The images can then be scaled such that they all have a common or proportionate distance between the centers of the eyes. In some embodiments, the average subject height is used to compute an estimated average distance between the centers of the eyes based on typical human proportions. The subject images are then scaled accordingly (e.g., a subject having an actual height that is 1.1 times the average height, is scaled to have a distance between the centers of the eyes that is 1.1 times the average distance). Such scaling can be performed at any time prior to or during the rendering of the assembled group image 108.

Figure 15:
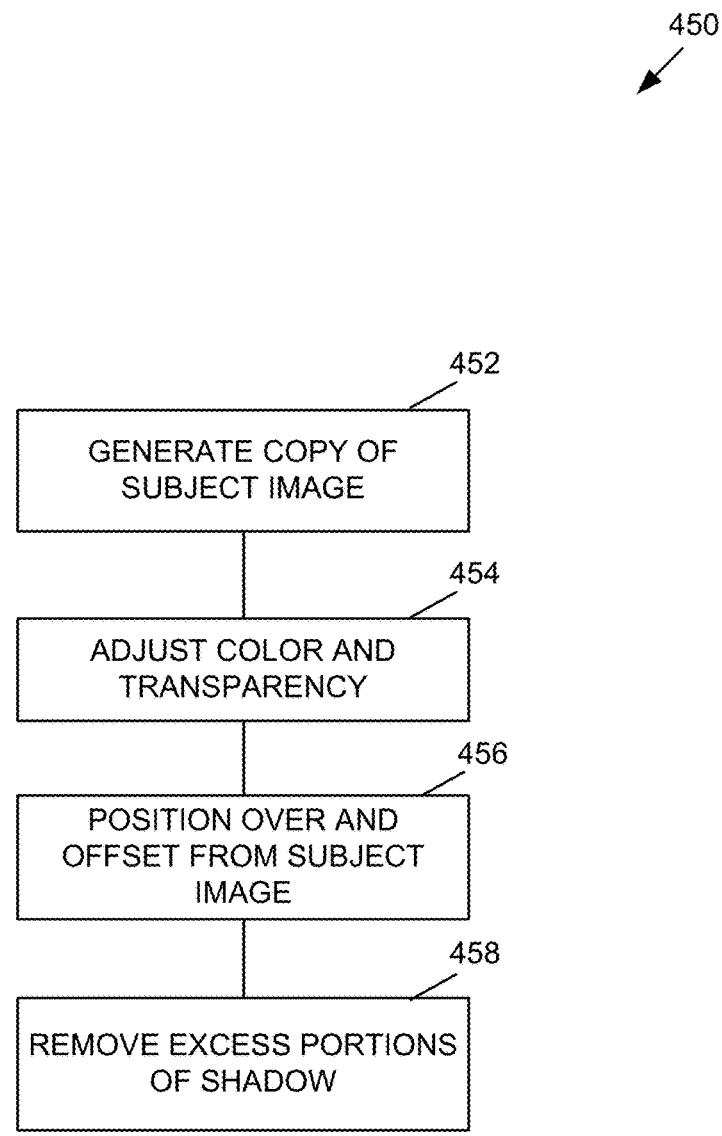
FIG. 15 illustrates an example method of generating subject shadows for an assembled group image.

FIG. 15 illustrates an example method 450 of generating subject shadows for an assembled group image, such as performed by the shadow generator 252, shown in FIG. 6. In some embodiments the shadows are inserted into the assembled group image during the rendering process illustrated in FIG. 14. In this example, method 450 includes operations 452, 454, 456, and 458.

Adding shadows can greatly improve the visual appearance of an assembled group image 108. The shadows help to emphasize the simulated three-dimensional arrangement of the subjects. Shadows also give the appearance that the subjects were all arranged together at once with common lighting, and therefore exhibit uniform (or uniformly varying) shadows throughout the assembled group image 108.

To generate the shadow for a given subject, operation 452 is first performed to generate a copy of the subject image of that subject.

The subject image is then processed in operation 454 to adjust the color and transparency of the subject to transform the subject image into a representation of a shadow. In some embodiments, the operation 454 involves changing the color of the copied image to all black, and adjusting the transparency of the image (to make the image semi-transparent). For example, the transparency is set to 50% in some embodiments. This permits images or background arranged behind the shadow to show through. The greater the transparency (closer to 100%) the lighter the shadow appears, while the lesser the transparency (closer to 0%), the darker the shadow appears. Further, in some embodiments the copy of image is blurred using a blurring function.

Figure 16:
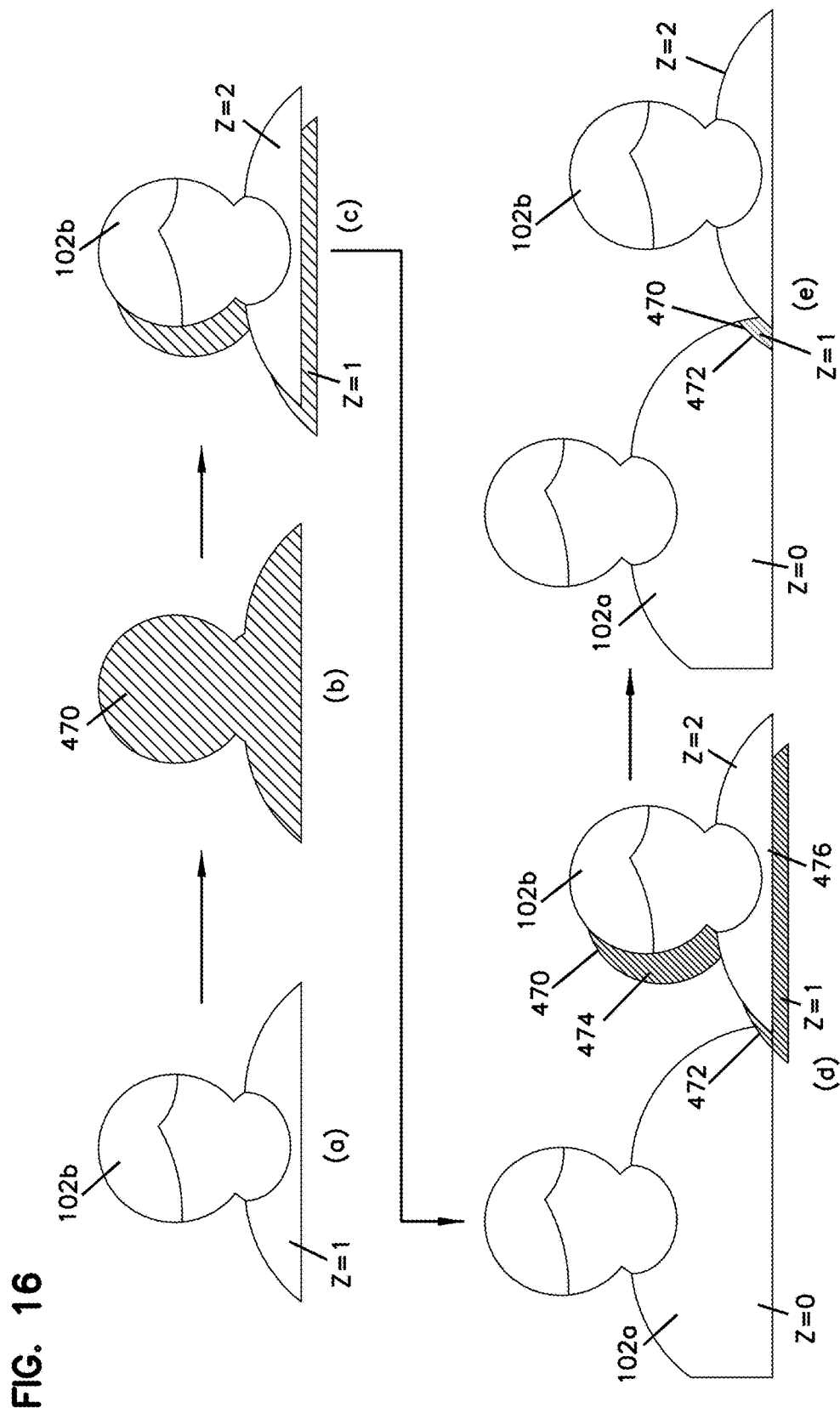
FIG. 16 illustrates an example of the method shown in FIG. 15.

In operation 456, the shadow is then positioned in the image behind the subject image and offset from the subject image by an offset distance in an offset direction. The magnitude of the offset distance and the direction of the offset are determined according to the desired apparent location of one or more light sources. For example, to obtain an appearance of a single light source positioned forward, above, and to the left of the subjects (or behind, above, and to the right from the viewer's perspective), the shadow is offset toward the left side of the workspace, and slightly down. An example is shown in FIG. 16. As a more specific example, the offset is arranged to the left 1.8% of the width (W1, in FIG. 9) of the workspace, and offset downward 1.2% of the workspace height (H1, in FIG. 9). The offset distance and direction can be adjusted as desired to obtain different lighting effects. For example, multiple shadows can be used to simulate multiple light sources. Additionally, the offset distance and direction can vary across the image, to simulate the varying light angles from one or more light sources.

For example, in some embodiments the shadow can be simulated to fall in a different plane, such as on a floor or other object. To simulate a natural shadow extending across the object, a perspective skew can be applied to the shadow to cause the shadow to appear to extend across the surface of that object.

In some embodiments, in order to place the shadow behind the image, the shadow is assigned a z-order that is one less than the z-order of the subject image. Z-orders of other subject images can be adjusted to accommodate the insertion. For example, if the shadow for the subject at Z=1 is inserted between that subject and the subject having Z=0, the shadow is assigned the z-order of Z=1, and the subject image is assigned the z-order of Z=2.

Operation 458 is then performed to remove all excess portions of the shadow. In some embodiments, each pixel of the shadow is evaluated to determine what other images are immediately behind (i.e., have a lower z-order than) that pixel. If the image behind the pixel is another subject, the pixel is determined to be an appropriate shadow, and therefore the pixel is not changed. If, however, the image behind the pixel is the background image, it is determined that the shadow should not be placed on the background. Therefore, the transparency of that pixel is set to 100%, effectively removing that portion of the shadow from the image.

FIG. 16 illustrates an example of the method 450 of generating subject shadows for an assembled group image. FIG. 16 illustrates steps (a)-(e).

The step (a) illustrates the subject image 102b for which a shadow is to be generated.

In the step (b), a copy of the subject image 102b is made to form a shadow 470, and adjusted to have the appearance of a shadow. For example, the color and transparency are adjusted as discussed herein.

The shadow 470 is offset from the subject image 102b in step (c), and the shadow 470 is inserted behind the subject image 102b. For example, the shadow 470 is assigned a z-order equal to the subject image z-order (Z=1), and the z-order of the subject is increased by one (Z=2).

As illustrated in step (d), the arrangement of the shadow 470 between the subject image 102b and another subject image 102a causes the shadow 470 to be displayed over any portion 472 of the subject 102a that is behind the shadow 470. In step (d), the remaining portions of the shadow 470 are removed. Specifically, any portion 474 and 476 of the shadow 470 that is arranged forward of the background, without any subject images therebetween, is removed. Removal can include adjusting the transparency of the associated pixels to make the pixels transparent. Alternatively, the shadow 470 image can be cut to remove any extraneous pixels.

Step (e) illustrates the resulting shadow portion 472 of the shadow 470 that is displayed on the subject 102a. The portions 474 and 476 (shown in step (d)) of the shadow 470 are not displayed, permitting the background to be visible behind the subject images 102a and 102b.

In the foregoing discussion, the relative terms such as "forward," "backward," "in front," and "behind" are sometimes used to refer to the z-orders of the respective images. Other embodiments utilize other techniques for arranging and tracking the relative depth of the objects within the image.

In some embodiments, the above processes are performed without visually displaying the results to the user. The results can subsequently be rendered in a user interface once the processing has been completed. Graphical representations of the various methods, operations, and processes are provided herein to permit the concepts to be visualized for ease of explanation. However, in other embodiments the operations are visually depicted in the manner, or a similar manner, illustrated in the drawings.

Figure 17:
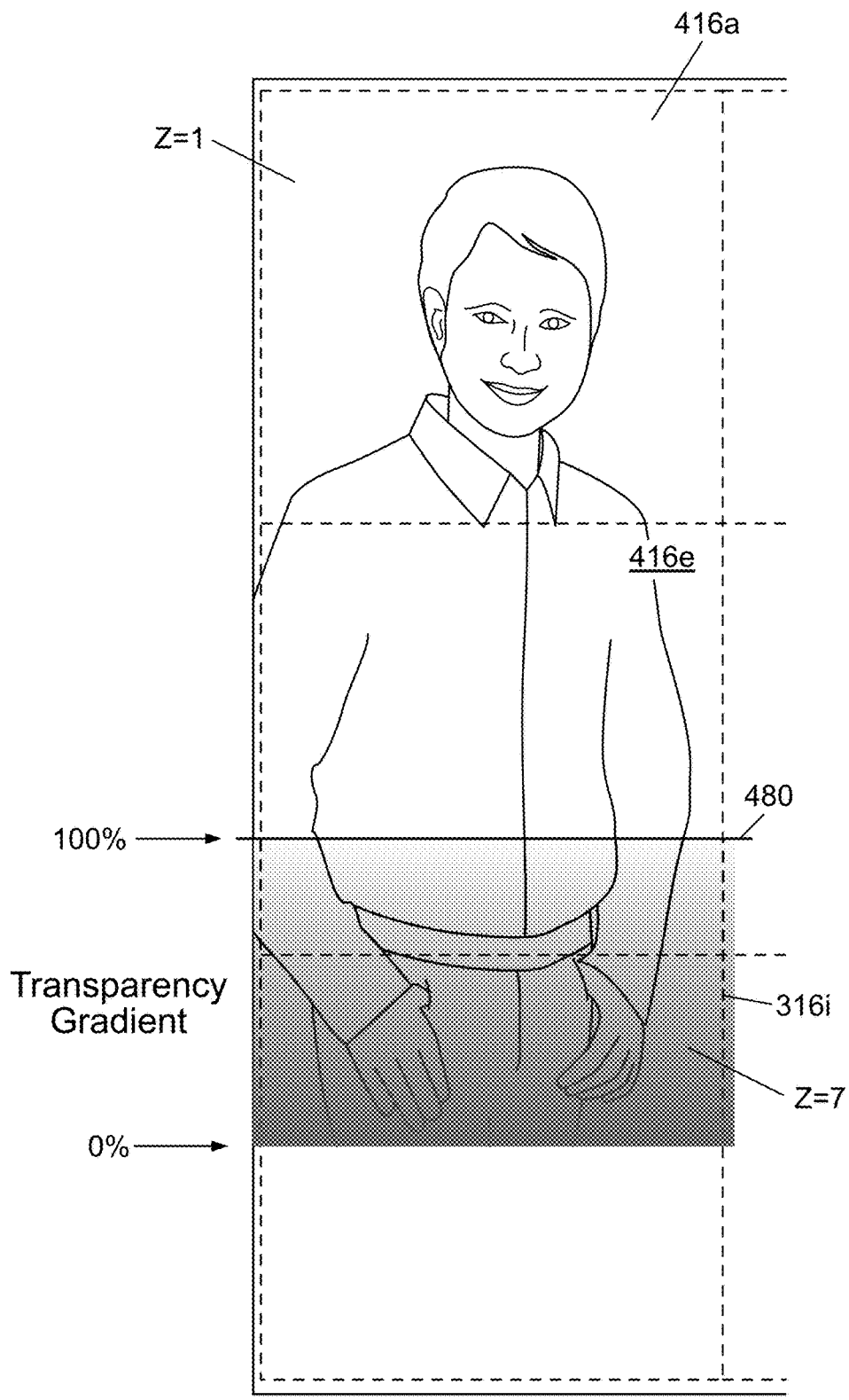
FIG. 17 is a schematic diagram illustrating a gradient mask.

FIG. 17 is a schematic diagram illustrating the use of a gradient mask 480 in an assembled group image.

In some implementations, the subject images 102 are only partial length photographs, such as ¾ length or ½ length. As a result, a bottom portion of the subject is not captured in the subject image. An example is shown in FIG. 17 in which a subject image 102a arranged at the final subject position 416a. The image 102a is a ¾ length image, which ends at about mid-thigh.

In order to ensure that the missing portion of the subject is not apparent in the image, a gradient mask 480 can be inserted into the image. In this example, the gradient mask is inserted in front of a row of subjects (e.g., the subjects in row 3) and positioned across the bottom of the images 102 in that row. Because the subject images are ¾ length, the gradient mask can be positioned at the top at approximately the height of the subject's waist or hips, and be positioned at the bottom to extend at least to the bottom of the image.

In some embodiments, the pixels of the gradient mask 480 are assigned a color, such as black. The gradient mask 480 is also configured to include a transparency gradient. The transparency gradient has a transparency of 100% at the top and a transparency of 0% at the bottom. In other words, the transparency varies from fully transparent at the top, to fully opaque at the bottom. The result is the appearance of a heavy shadow below the cut-off edge of the subject image 416e, which gradually lightens to reveal the subject. The gradient mask is arranged in front of the subjects in the row, for example, the gradient mask is assigned a z-order of 7, in this example, which is forward of the subject images and associated shadows.

Additional gradient masks 480 can similarly be added for any cut-off portions that may be visible within the workspace. If the cut-off portion of the image falls below the workspace, such as will typically be the case for subjects in the front row, the gradient mask 480 can be omitted as unnecessary.

In some embodiments, the position (i.e., z-order) of the gradient mask 480 operates to identify the rows that subjects are arranged in. For example, all subjects having a z-order of less than 7 are determined to be in the back row. All subjects having a z-order of greater than 7, but less than the next gradient mask are in the next row, etc.

When all of the subjects have been properly arranged in the workspace, as described herein, additional artwork and text data 272 are added in some embodiments. Alternatively, the artwork and text data 272 can be added earlier in the process. Artwork can include background art images that form the background of the image, or can include other artwork, such as a border arranged outside of the workspace, or a graphical element to be displayed in the foreground or an unused portion of the workspace. Text data can similarly be arranged in a border region, on the background, or as a foreground object.

In some embodiments, a final assembled group image 108 is provided to a production station 130, such as illustrated and described with reference to FIG. 2, and ultimately made into one or more products 132. The products 132 are provided to one or more customers C1, C2, and C3.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of generating an assembled group image from subject images, the method comprising:
   receiving by at least one computing device image selection criteria;
   determining subjects to be included in the assembled group image, the subjects associated with one or more subject images;
   for each of the determined subjects, conducting a search using the at least one computing device to select a subject image for inclusion in the assembled group image from the one or more subject images by querying a data store of information about the subject image using the received image selection criteria;
   generating by the at least one computing device an arrangement for the selected subject images based on information about the subject images stored in the data store, the arrangement including subject positions that are based at least in part on information stored in the data store; and
   generating by the at least one computing device the assembled group image by arranging the subject images at the subject positions.

2. The method of claim 1, further comprising:
   identifying a plurality of subjects for inclusion in the assembled group image; and
   wherein selecting subject images comprises selecting subject images for the identified subjects.

3. The method of claim 2, wherein the subjects are identified based on group affiliation data for the subjects.

4. The method of claim 3, wherein the group affiliation data identifies affiliation with at least one a school, a class, a team, a club, a business unit, and a department.

5. The method of claim 1, wherein the information about the subject images comprises body points information, the method further comprising processing at least one of the subject images to identify locations of body points in the at least one of the subject images.

6. The method of claim 1, wherein determining an arrangement for the selected subject images further comprises:
   determining a number of subjects to be included in the assembled group image;
   determining a size of a workspace for the assembled group image;
   determining a number of rows and a number of subjects per row to fit the number of subjects in the workspace; and
   identifying the subject positions in the workspace wherein the number of subject positions equals the number of subjects and wherein the subject positions are arranged in the number of rows and having a number of subject positions per row that equals the number of subjects per row.

7. The method of claim 6, wherein the number of subjects is identified based on the number of subjects that are associated with a particular group.

8. The method of claim 6, wherein determining an arrangement for the selected subject images further comprises determining a desired head size for the subject positions.

9. The method of claim 8, wherein generating the assembled group image comprises scaling the subject images according to the desired head size.

10. The method of claim 6, further comprising selecting a subject image for a subject position based on information about the subject images.

11. The method of claim 10, wherein the information about the subject images comprises pose information, including a direction the subject is facing, wherein subject images are selected for subject positions so that the subject is facing a center of the assembled group image.

12. The method of claim 10, wherein the information about the subject images comprises pose information, including arm position information, wherein subject images are selected to have the same arm position.

13. The method of claim 6, further comprising assigning a z-order to the subject positions based on a row position of the subject position.

14. The method of claim 13, wherein generating the assembled group image further comprises generating subject shadows, generating subject shadows comprising:
    generating a copy of a subject image;
    adjusting the color and transparency of the copy of the subject image and blurring to generate a representation of a shadow;
    offsetting the representation of the shadow from the subject image;
    removing excess portions of the representation of the shadow; and
    applying the representation of the shadow to other subject images based on z-order.

15. An assembly station for generating an assembled group image from subject images, the assembly station comprising:
    at least one processing device; and
    at least one computer readable storage device, wherein the at least one computer readable storage device comprises data instructions, which when executed by the at least one processing device, cause the processing device to:
        receive image selection criteria;
        determine subjects to be included in the assembled group image, the subjects associated with one or more subject images;
        for each of the determined subjects, conduct a search using the at least one computing device to select a subject image for inclusion in the assembled group image from the one or more subject images by querying a data store of information about the subject image using the received image selection criteria;
        generate an arrangement for the selected subject images based on information about the subject images stored in the data store, the arrangement including subject positions that are based at least in part on information stored in the data store; and
        generate the assembled group image by arranging the subject images at the subject positions.

16. The assembly station of claim 15, comprising further data instructions that cause the processing device to:
    determine whether a subject image includes a cut-off portion; and
    when determined that the subject image includes a cut-off portion, apply a gradient mask to the subject images.

17. The assembly station of claim 16, wherein the gradient mask comprises a transparency gradient having a transparency of 100% at a top and 0% at a bottom, the bottom being aligned with the cut-off portion of the subject image.

18. The assembly station of claim 17, wherein the arrangement for the selected subject images comprises multiple rows of subject positions, and wherein the data instructions further cause the processing device to assign subject images to subject positions within the rows and to generate gradient mask for the subject images based on the row assignment.

19. A method of generating an assembled group image from subject images, the method comprising:
    receiving by at least one computing device image selection criteria, including group affiliation criteria;
    identifying by the at least one computing device using the image selection criteria a plurality of subjects for inclusion in an assembled group image based on group affiliation data for the plurality of subjects by querying a data store of information about the subject images using the received image selection criteria, the plurality of subjects associated with one or more subject images;
    determining a number of the identified subjects to be included in the assembled group image;
    determining a size of a workspace for the assembled group image;
    determining a number of rows and a number of subjects per row to fit the number of subjects in the workspace;
    identifying the subject positions in the workspace wherein the number of subject positions equals the number of subjects and wherein the subject positions are arranged in the number of rows and having a number of subject positions per row that equals the number of subjects per row;
    for each of the plurality of identified subjects, conducting a search using the at least one computing device to select a subject image from the one or more subject images for the identified subject positions based on pose information about the subject images stored in the data store, including a direction the subject is facing, wherein the subject images are selected for subject positions so that the subject is facing a center of the assembled group image; and
    generating by the at least one computing device the assembled group image by arranging the subject images at the subject positions.

20. The method of claim 19, further comprising:
    extracting an identifier from metadata stored with at least one of the subject images; and
    using the identifier to retrieve information about the at least one subject image from a database of image-specific data for the subject images.

21. The method of claim 1, wherein the image selection criteria include information about subject pose in subject images.

* * * * *